(12) United States Patent
Mizushima et al.

(10) Patent No.: US 10,951,096 B2
(45) Date of Patent: Mar. 16, 2021

(54) METHOD AND APPARATUS FOR PRODUCING ROTATING ELECTRIC MACHINE STATOR

(71) Applicants: TOYOTA JIDOSHA KABUSHIKI KAISHA, Toyota (JP); DENSO CORPORATION, Kariya (JP)

(72) Inventors: Daisuke Mizushima, Toyota (JP); Yasuyuki Hirao, Okazaki (JP); Hiroaki Takeda, Kariya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 173 days.

(21) Appl. No.: 16/369,391

(22) Filed: Mar. 29, 2019

(65) Prior Publication Data
US 2019/0312494 A1 Oct. 10, 2019

(30) Foreign Application Priority Data
Apr. 6, 2018 (JP) .............................. JP2018-074182

(51) Int. Cl.
H02K 15/00 (2006.01)
(52) U.S. Cl.
CPC .... *H02K 15/0087* (2013.01); *Y10T 29/49009* (2015.01)
(58) Field of Classification Search
CPC .......... H02K 15/0087; H02K 15/0435; H02K 15/0037; H02K 15/0428; H02K 3/12; Y10T 29/49009; Y10T 29/53161
USPC ......................................................... 29/596
See application file for complete search history.

(56) References Cited

U.S. PATENT DOCUMENTS

| | | | | |
|---|---|---|---|---|
| 6,519,993 | B2* | 2/2003 | Even ................... | H02K 15/0037 |
| | | | | 29/596 |
| 6,557,239 | B2* | 5/2003 | Takahashi .......... | H02K 15/0428 |
| | | | | 29/596 |
| 10,361,611 | B2* | 7/2019 | Hirao .................. | H02K 15/0031 |
| 2017/0117780 | A1 | 4/2017 | Hirao | |

(Continued)

FOREIGN PATENT DOCUMENTS

| | | |
|---|---|---|
| CN | 106877583 A | 6/2017 |
| JP | 2006-136082 A | 5/2006 |
| JP | 2017-085678 A | 5/2017 |

(Continued)

*Primary Examiner* — Donghai D Nguyen
(74) *Attorney, Agent, or Firm* — Sughrue Mion, PLLC

(57) ABSTRACT

A method of producing a rotating electric machine stator includes an insertion step, bending step, and pressing step. In the insertion step, two leg portions of each U-shaped coil wire of a stator coil are inserted into different slots, such that protruding portions as distal end portions of the leg portions protrude in parallel with an axial direction of the stator core. In the bending step, the protruding portion of a first leg portion is bent in a first circumferential direction of the stator core, at a proximal end portion of the protruding portion as a bending start point, from a condition where the protruding portion protrudes from the slot in parallel with the axial direction of the stator core. In the pressing step, a distal end of the protruding portion bent in the first circumferential direction is pressed toward its proximal end in a second circumferential direction.

7 Claims, 11 Drawing Sheets

(56) References Cited

U.S. PATENT DOCUMENTS

2017/0126106 A1   5/2017   Mizushima et al.

FOREIGN PATENT DOCUMENTS

| JP | 2017-085775 A | 5/2017 |
| JP | 2017-085806 A | 5/2017 |

* cited by examiner

FIRST CIRCUMFERENTIAL DIRECTION

COMPARATIVE EXAMPLE

COMPARATIVE EXAMPLE

METHOD AND APPARATUS FOR PRODUCING ROTATING ELECTRIC MACHINE STATOR

INCORPORATION BY REFERENCE

The disclosure of Japanese Patent Application No. 2018-074182 filed on Apr. 6, 2018 including the specification, drawings and abstract is incorporated herein by reference in its entirety.

BACKGROUND

1. Technical Field

The disclosure relates to method and apparatus for producing a stator of a rotating electric machine.

2. Description of Related Art

A method of producing a stator of a rotating electric machine using a plurality of segment coils (coil wires) is described in Japanese Unexamined Patent Application Publication No. 2006-136082 (JP 2006-136082 A). According to this production method, the segment coils are inserted into a plurality of slots of a stator core, and end portions of the segment coils which protrude from an end face of the stator core are bent in a circumferential direction by means of a coil twisting device. Then, the end portions of segment coils located adjacent to each other in a radial direction of the stator core are welded, thereby to form a stator coil.

When the end portions of the segment coils are subjected to bending forming, the end portions of the segment coils which protrude from an axial end face of the stator core are inserted into coil receiving portions in the form of a plurality of holes formed in an end face of a twisting ring that constitutes the coil twisting device, and the twisting ring is rotated. Then, the twisting ring is moved toward the stator core in the axial direction. As a result, the end portions of the segment coils are bent in a circumferential direction. Also, in a condition after bending, no straight portions that extend in the axial direction are formed in the end portions of the segment coils. Thus, the axial length of coil ends disposed outside the axial end face of the stator core may be reduced.

SUMMARY

Before the step of bending the coil wires is conducted, variations may arise in the axial positions of distal ends of the coil wires, due to variations in the length of the coil wires, variations in assembling of the coil wires, etc., in a condition where distal end portions of the coil wires protrude from the axial end face of the stator core. In this case, when the distal end portions of the coil wires are bent in the circumferential direction, by the production method described in JP 2006-136082 A, the circumferential positions of the distal ends of the coil wires after bending may deviate from intended or desired positions, and variations in the distal ends of the coil wires may be increased. As a result, the distal end portions of the coil wires adjacent to each other in a radial direction of the stator core may be misaligned, which may make it difficult to weld the adjacent coil wires in the following step.

A method of producing a rotating electric machine stator and a production apparatus according to the disclosure are provided for improving accuracy in positioning of distal ends of coil wires in a circumferential direction, in a condition where distal end portions of the coil wires which protrude from an end face of a stator core are bent in the circumferential direction.

A first aspect of the disclosure provides a method of producing a rotating electric machine stator including a stator core having a plurality of teeth that extend in radial directions from an annular yoke and a plurality of slots defined between adjacent ones of the teeth, and a stator coil wound around the teeth. The stator coil includes a plurality of U-shaped coil wires each having a first leg portion and a second leg portion that are parallel to each other, and a connecting portion that connects the first leg portion and the second leg portion. The method includes an insertion step of inserting the first leg portion and the second leg portion of each of the coil wires into different ones of the slots, such that a distal end portion of the first leg portion and a distal end portion of the second leg portion protrude from corresponding ones of the slots, in parallel with an axial direction of the stator core, to provide a protruding portion of the first leg portion and a protruding portion of the second leg portion, respectively, a bending step of bending the protruding portion of the first leg portion in a first circumferential direction of the stator core, at a proximal end portion of the protruding portion as a bending start point, from a condition where the protruding portion protrudes from a corresponding one of the slots in parallel with the axial direction of the stator core, and a pressing step of pressing a distal end of the protruding portion bent in the first circumferential direction, toward a proximal end of the protruding portion in a second circumferential direction of the stator core. The distal end of the protruding portion is pressed in the second circumferential direction in the pressing step, so as to reach a final pressed position that is spaced by a predetermined amount in the first circumferential direction from a position of the proximal end of the protruding portion as a reference position, and the protruding portion is plastically deformed in the bending step and the pressing step.

According to the stator production method of the disclosure, in the pressing step, the distal end of the protruding portion is pressed in the second circumferential direction, so as to reach the final pressed position that is spaced from the proximal position of the protruding portion of the first leg portion by the predetermined amount in the first circumferential direction. Thus, in production of a plurality of rotating electric machine stators, the protruding portions located at the same positions are bent, such that the amount of deformation at the proximal end differs according to differences in the length due to variations in the protruding portions. More specifically, when the protruding portion is longer than a given length, it is largely bent at the proximal end. When the protruding portion is shorter than the given length, it is bent by a small amount at the proximal end. In this manner, in a condition where the protruding portions as the distal end portions of the coil wires which protrude from the end face of the stator core are bent in the circumferential direction, it is possible to reduce an influence of variations in the length of the coil wires, and improve the accuracy in positioning of distal ends of the coil wires in the circumferential direction. Also, since the pressing step is performed after the bending step, the protruding portion of the coil wire is prevented from being bent in opposite directions at its distal end portion and proximal end portion, unlike the case where bending of the protruding portion of the coil wire in the first circumferential direction at the proximal end portion as the bending start point is started at the same time as pressing of the distal end of the protruding portion in the second circumferential direction. Thus, sufficient accuracy in the shape of the distal end portions of the coil wires is likely to be ensured. Consequently, the accuracy in positioning of the distal ends of the coil wires in the circumferential direction can be improved.

In the method according to the above aspect of the disclosure, the pressing step may include further bending the protruding portion bent in the first circumferential direction in the bending step, in the first circumferential direction, while pressing the distal end in the second circumferential direction.

According to the above method, the time required to bend the protruding portion of the coil wire can be shortened, as compared with the case where the protruding portion is only pressed in the second circumferential direction in the pressing step.

In the method as described above, the bending step may include bending the protruding portion in the first circumferential direction, by placing a jig at one side of the stator core such that the jig faces the protruding portion, and moving the jig toward the stator core in the axial direction while moving the jig in the first circumferential direction, in a condition where the jig is in contact with a distal end portion of the protruding portion, but is not in contact with a first circumferential end of the distal end portion of the protruding portion. The first circumferential end faces in the first circumferential direction. The pressing step may include bending the protruding portion in the first circumferential direction, while pressing the distal end of the protruding portion in the second circumferential direction, by use of the jig, by moving the jig toward the stator core in the axial direction while moving the jig in the first circumferential direction, in a condition where the jig is in contact with an axial end and the first circumferential end of the distal end portion of the protruding portion.

According to the above method, the bending step and the pressing step are carried out using the same jig, so that the coil wires can be easily deformed in a continuous manner.

A second aspect of the disclosure provides a method of producing a rotating electric machine stator including a stator core having a plurality of teeth that extend in radial directions from an annular yoke and a plurality of slots defined between adjacent ones of the teeth, and a stator coil wound around the teeth. The stator coil includes a plurality of U-shaped coil wires each having a first leg portion and a second leg portion that are parallel to each other, and a connecting portion that connects the first leg portion and the second leg portion. The method includes an insertion step of inserting the first leg portion and the second leg portion of each of the coil wires into different ones of the slots, such that a distal end portion of the first leg portion and a distal end portion of the second leg portion protrude from corresponding ones of the slots, in parallel with an axial direction of the stator core, to provide a protruding portion of the first leg portion and a protruding portion of the second leg portion, respectively, a non-restrained bending step of bending the protruding portion of the first leg portion in a first circumferential direction of the stator core, at a proximal end portion of the protruding portion as a bending start point, in a non-restrained condition in which a distal end portion of the protruding portion is allowed to free move in the first circumferential direction of the stator core, from a condition where the protruding portion protrudes from a corresponding one of the slots in parallel with the axial direction of the stator core, and a restrained bending step of bending the protruding portion in the first circumferential direction while moving a distal end of the protruding portion to a predetermined position in the axial direction in a condition where the distal end portion is restrained at one side facing in the first circumferential direction, so that the distal end reaches a position that is returned in a second circumferential direction of the stator core from a position that would be reached in the case where the protruding portion bent in the first circumferential direction is assumed to be continuously bent in the first circumferential direction such that the distal end is moved to the predetermined position in the axial direction in the non-restrained condition.

According to the method of the above aspect of the disclosure, in a condition where the protruding portions as the distal end portions of the coils wires which protrude from the end face of the stator core are bent in the circumferential direction, it is possible to reduce an influence of variations in the length of the coil wires, and improve accuracy in positioning of the distal ends of the coil wires in the circumferential direction. Also, since the restrained bending step is performed after the non-restrained bending step, sufficient accuracy in the shape of the distal end portions of the coil wires is likely to be ensured.

A third aspect of the disclosure provides a production apparatus used in the method of producing a rotating electric machine stator according to the first aspect of the disclosure. The production apparatus includes a holder that holds the stator core, in a condition where the first leg portion and the second leg portion are inserted in different ones of the slots, such that the protruding portions of the first leg portion and the second leg portion protrude from the slots in parallel with the axial direction of the stator core, a jig that bends the protruding portion of the first leg portion in the first circumferential direction, at the proximal end portion of the protruding portion as the bending start point, from a condition where the protruding portion protrudes in parallel with the axial direction of the stator core, a jig driver that moves the jig, and a controller that controls the jig driver. The controller controls the jig driver to move the jig relative to the stator core along a first locus, such that the jig becomes closer to the stator core, and then move the jig relative to the stator core along a second locus. The controller controls the jig driver to bend the protruding portion of the first leg portion in the first circumferential direction, at the proximal end portion of the protruding portion as the bending start point, through relative movement of the jig and the stator core along the first locus. The controller controls the jig driver to press the protruding portion bent in the first circumferential direction until the distal end reaches the final pressed position, toward the proximal end in the second circumferential direction, through relative movement of the jig and the stator core along the second locus.

With the stator production apparatus according to the above aspect of the disclosure, the distal end of each protruding portion is pressed to the final pressed position in the second circumferential direction, through relative movement of the jig and the stator core along the second locus. Therefore, in production of a plurality of rotating electric machine stators, the protruding portions located at the same positions are bent such that the amount of deformation at the proximal end differs according to differences in the length due to variations in the protruding portions. Thus, in a condition where the protruding portions as the distal end portions of the coil wires protruding from the end face of the stator core are bent in the circumferential direction, it is possible to reduce the influence of variations in the length of the coil wires, and improve accuracy in positioning of the distal ends of the coil wires in the circumferential direction.

In the production apparatus as described above, the controller may control the jig driver to further bend the protruding portion bent in the first circumferential direction along the first locus, in the first circumferential direction, while pressing the distal end in the second circumferential direction, through relative movement of the jig and the stator core along the second locus.

With the above arrangement, the jig and the stator core are moved relative to each other along the second locus, so that the time required to bend the protruding portion of each coil wire can be shortened, as compared with the case where the protruding portion of the coil wire is only pressed in the second circumferential direction.

In the production apparatus as described above, the jig may include a ring portion that is rotatable about an axis located on an extension of a center axis of the stator core. The ring portion may include a plurality of claw portions that protrudes from an end face that faces the stator core. Each of the claw portions may have a first face as a convex curved surface that faces in the first circumferential direction and protrudes toward the stator core, and a second face that faces in the second circumferential direction. The second face may be a flat surface perpendicular to a circumferential direction or a concave curved surface that is recessed in the first circumferential direction. The controller may control the jig driver to move the ring portion in the first circumferential direction while moving the ring portion toward the stator core in the axial direction, in a condition where the first face of each of the claw portions of the ring portion is in contact with a side face of the protruding portion of the first leg portion, and then move the ring portion in the first circumferential direction while moving the ring portion toward the stator core in the axial direction, in a condition where the second face of each of the claw portions is in contact with the first circumferential end of the protruding portion, such that the distal end of the protruding portion becomes closer to the proximal end.

With the above arrangement, the process of bending the protruding portion of the coil wire in the circumferential direction in a condition where the protruding portion is in contact with the first face of the claw portion, and the process of bending the protruding portion in the circumferential direction while the second face of the claw portion is pressing the distal end toward the proximal end while restraining the distal end portion of the protruding portion can be more easily performed in a continuous manner.

According to the method and apparatus for producing the rotating electric machine stator of the disclosure, it is possible to improve the accuracy in positioning of the distal ends of the coil wires in the circumferential direction, in a condition where the distal end portions of the coil wires which protrude from the end face of the stator core are bent in the circumferential direction.

BRIEF DESCRIPTION OF THE DRAWINGS

Features, advantages, and technical and industrial significance of exemplary embodiments of will be described below with reference to the accompanying drawings, in which like numerals denote like elements, and wherein.

DETAILED DESCRIPTION OF EMBODIMENTS

Figure 1:
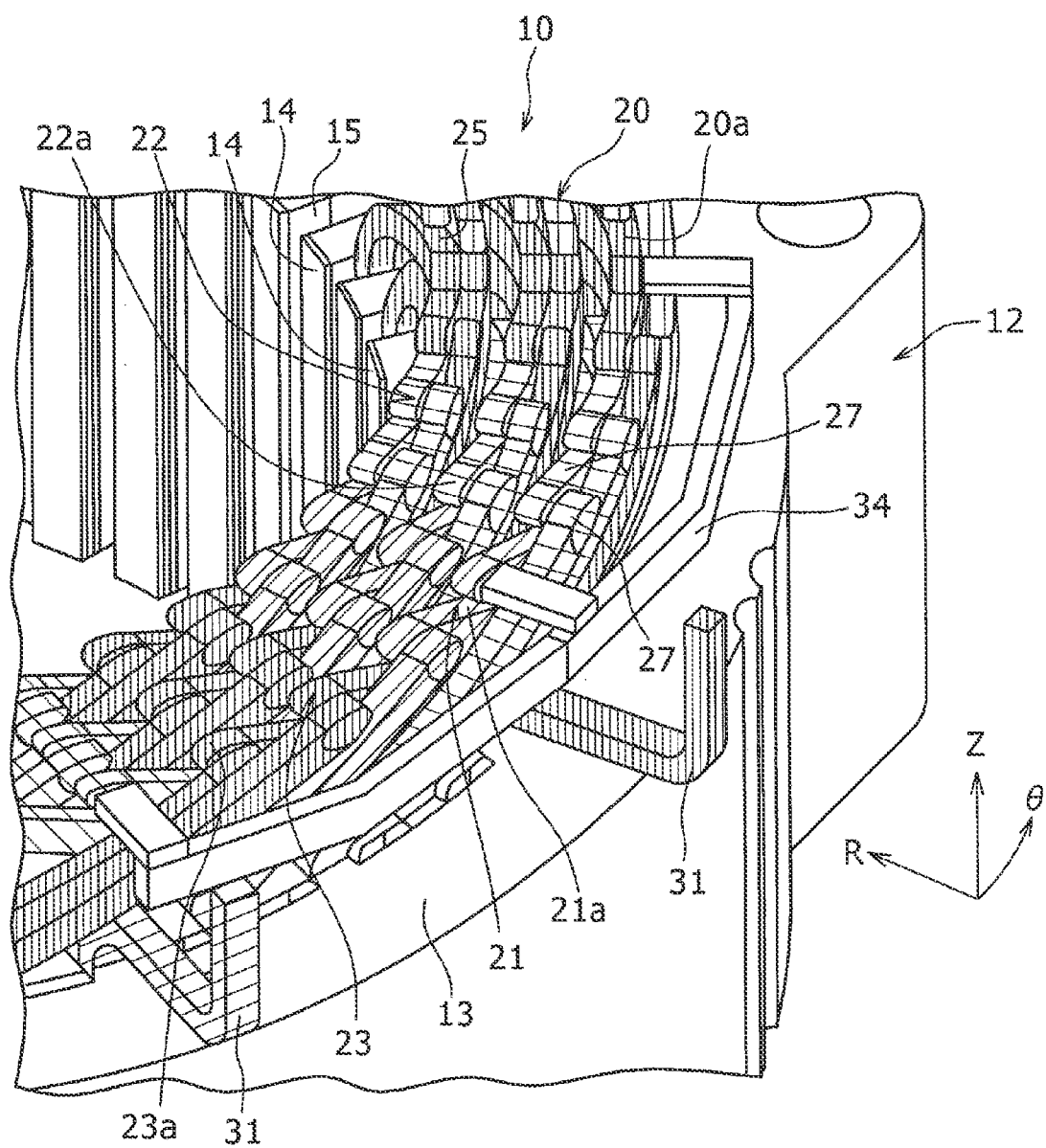
FIG. 1 is a perspective view showing a circumferential part of a rotating electric machine stator produced according to a production method of one embodiment of the disclosure.

One embodiment of the disclosure will be described with reference to the drawings. The shapes, materials, and numbers of components described below are illustrated by way of example, for the sake of explanation, and may be changed as needed according to the specification of a rotating electric machine stator. In all of the drawings, the same reference numerals are assigned to the same or equivalent elements. Also, in the description in the text, the reference numerals previously mentioned will be used as needed.

In the following description of the drawings and embodiment, "R" denotes a radial direction of the rotating electric machine stator and a stator core, and "θ" denotes a circumferential direction of the rotating electric machine stator and stator core, while "Z" denotes an axial direction of the rotating electric machine stator and stator core. The directions denoted as "R", "Z", and "θ" are perpendicular to each other. The axial direction Z shown in FIG. 1 and FIG. 2A is actually a direction that extends along an axis O1 (FIG. 2A) located on an extension of the center axis of the stator core 12.

FIG. 1 is a perspective view showing a circumferential part of the rotating electric machine stator 10 produced according to a production method of the embodiment. In the following description, the rotating electric machine stator 10 will be referred to as "stator 10". As shown in FIG. 1, the stator 10 includes a stator core 12, and a stator coil 20.

Figure 2A:
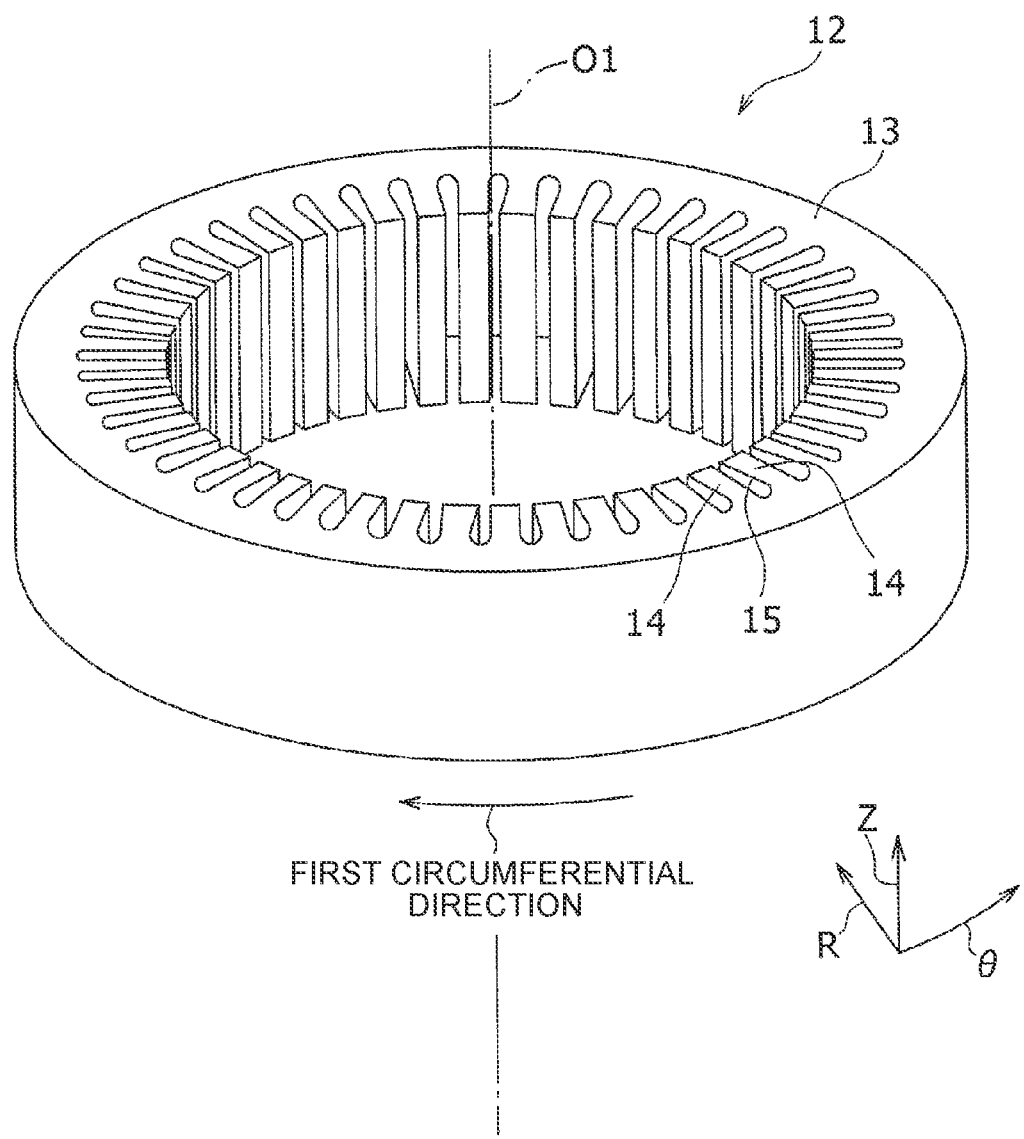
FIG. 2A is a perspective view of a stator core in which a part of the stator core is omitted.

FIG. 2A is a perspective view of the stator core 12 in which a part of the stator core 12 is omitted. The stator core 12 is an annular magnetic component, and consists of a plurality of silicon steel sheets (electromagnetic steel sheets) laminated in the axial direction Z, for example. The stator core may be formed by subjecting a resin binder and magnetic power to pressure forming.

The stator core 12 has an annular yoke 13 disposed on the radially outer side, and a plurality of teeth 14 that extends in radial directions R from an inner circumferential surface of the yoke 13. The teeth 14 are arranged at intervals in the circumferential direction θ. A slot 15 in the form of a groove is formed between two adjacent ones of the teeth 14.

Referring back to FIG. 1, the stator coil 20 includes coils 21, 22, 23 of three phases U, V, W, which extend in a spiral fashion. Each of the coils 21, 22, 23 of the three phases U, V, W is wound around two or more teeth 14 while being inserted through the slots 15, such that each coil extends across two or more teeth 14.

Each of the coils 21, 22, 23 of the three phases U, V, W is formed by connecting a plurality of segment coils 21a, 22a, 23a in series. Each segment coil 21a, 22a, 23a is formed by bending a plurality of generally U-shaped coil wires 25 (FIG. 2B), and then welding the wires 25 together.

Figure 2B:
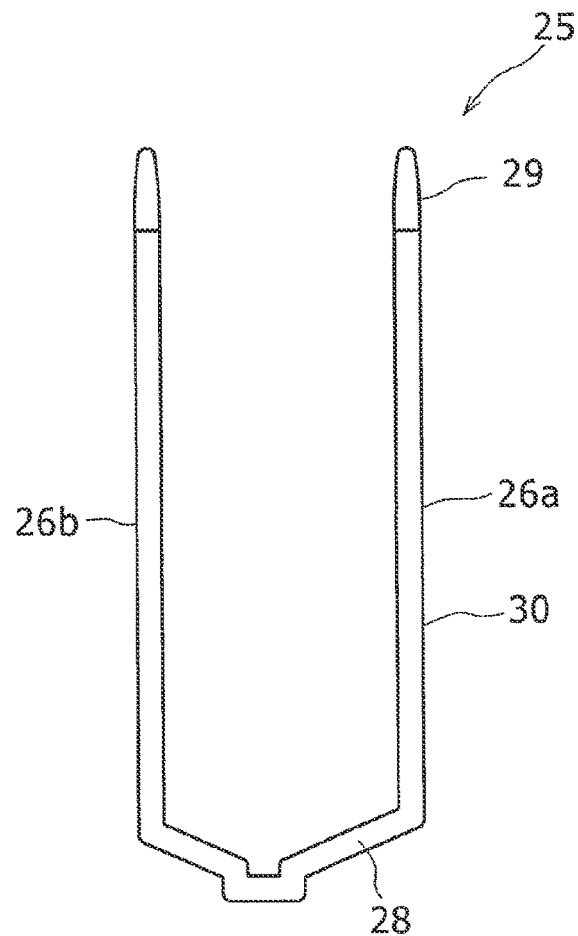
FIG. 2B is a view showing a coil wire before it is inserted in the stator core.

FIG. 2B shows a coil wire 25 that has not been inserted in the stator core 12 (FIG. 2A). The coil wire 25 has a first leg portion 26a and a second leg portion 26b as two straight leg portions that are parallel with each other, and a hill-shaped connecting portion 28 that connects first-direction-side ends of the first and second leg portions 26a, 26b with each other. A distal end face of each leg portion 26a, 26b is formed in the shape of a curved surface having a hill-shaped cross-section. The coil wire 25 is formed by covering a longitudinally middle portion of a conductor wire 29 as a rectangular wire having a rectangular cross-section, with an insulating film 30, and exposing opposite end portions of the conductor wire 29 from the insulating film 30.

To form each segment coil 21a, 22a, 23a (FIG. 1), the coil wires 25 arranged in the radial direction R (FIG. 1) are inserted into two slots 15 disposed so as to sandwich two or more teeth 14, such that the coil wires 25 extend across first axial end faces (lower end faces of FIG. 1) of the teeth 14. The first axial end faces mean end faces that face in a first direction as the axial direction Z. At this time, protruding portions as distal end portions of the two leg portions of each coil wire 25 protrude from a second axial end face (upper end face of FIG. 1) of the stator core 12. The second axial end face means an end face that faces in a second direction as the axial direction Z. Then, after the protruding portions of the coil wires 25 are bent in the circumferential direction, distal end portions of the protruding portions of the coil wires 25 laminated in the radial direction R are welded by laser welding, or the like, so that the coil wires are connected to form a spiral. At this time, portions of the coil wires 25 where the conductor wires 29 are exposed are welded. In this manner, each of the segment coils 21a, 22a, 23a is wound around two or more teeth 14 so as to extend across the teeth 14. Also, each of the U-, V-, W-phase coils 21, 22, 23 is formed in an annular shape, by connecting end portions of the corresponding segment coils 21a, 22a, 23a.

Further, in the coil 21, 22, 23 of each phase, a protruding portion of the coil wire disposed at the first-direction-side end extends radially outwardly of the stator core 12, to provide a connecting end portion 31, and a power line on the power supply side is electrically connected to the connecting end portion 31. In FIG. 1, the U-phase coil 21 and V-phase coil 22 are indicated by hatched lines extending in opposite directions, and the W-phase coil 23 is indicated by a plurality of vertical lines. In the coil 21, 22, 23 of each phase, a protruding portion of the coil wire disposed at the second-direction-side end is connected, at the radially outer side of the stator core 12, to a neutral bus bar 34. In this manner, the stator coil 20 is wound by distributed winding around the teeth 14. At this time, no straight portions parallel to the axial direction are formed in the distal end portions of the protruding portions of the coil wires 25 which protrude from the second axial end face (upper end face of FIG. 1) of the stator core 12. Thus, in the stator coil 20, the axial length of a coil end 20a disposed outside the second axial end face of the stator core 12 can be reduced.

When the rotating electric machine (not shown) is produced, a rotor (not shown) is located radially inwardly of the stator 10, with a clearance provided in the radial direction R.

The rotating electric machine may be configured to have both of the functions of a motor and a generator, but may have only one of the functions of the motor and generator.

Figure 3:
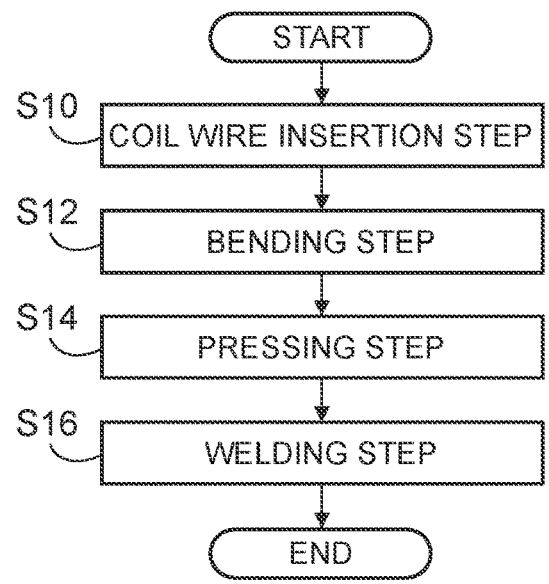
FIG. 3 is a flowchart illustrating the production method of the rotating electric machine stator of the embodiment.

Next, a stator production method of the embodiment for producing the stator 10 as described above will be described in detail. FIG. 3 is a flowchart illustrating the stator production method of the embodiment. Initially, according to this production method, a coil wire insertion step is performed as step S10.

Figure 4A:
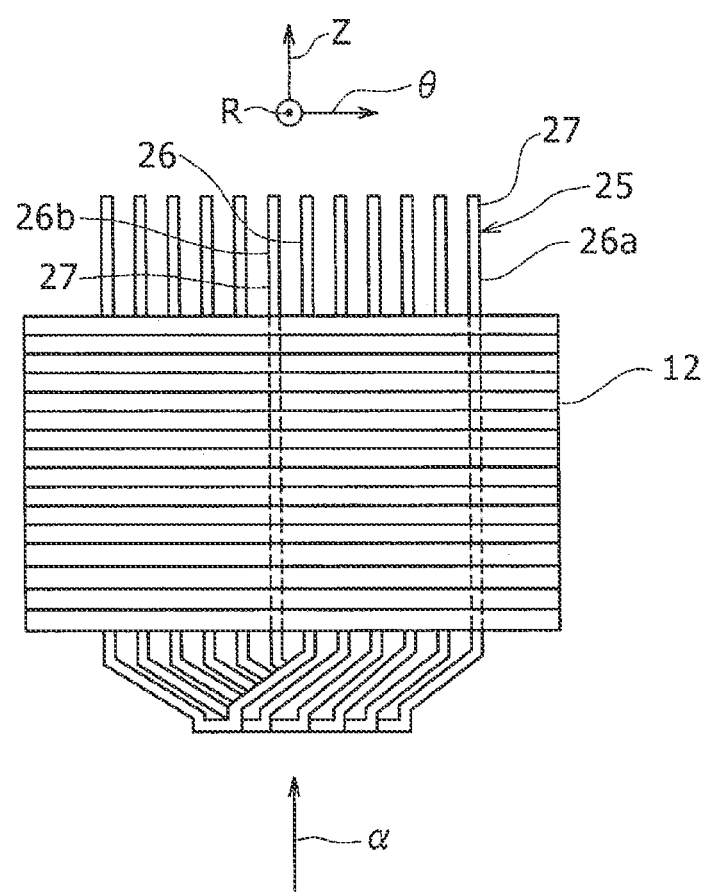
FIG. 4A is a view showing a condition in which coil wires are inserted in the stator core, in a coil wire insertion step.

FIG. 4A shows a condition where the coil wires 25 are inserted in the stator core 12, in the coil wire insertion step. In the coil wire insertion step, two leg portions 26a, 26b of each of the U-shaped coil wires 25 that constitute a stator coil are inserted in slots 15 (FIG. 2A) that are different between the two leg portions, in a direction of arrow a in FIG. 4A, such that a protruding portion 27 as a distal end portion of each of the two leg portions 26a, 26b protrudes from the second axial end face (upper end face in FIG. 4A) of the stator core 12. In this condition, the respective protruding portions 27 of the two leg portions 26a, 26b of each coil wire 25 protrude from the slots 15, in a direction parallel to the axial direction Z of the stator core 12. In FIG. 4A, the number of the coil wires 25 inserted in the stator core 12 is indicated to be smaller than that in the case of FIG. 1.

Further, in the coil wire insertion step, two or more, e.g., six U-shaped coil wires 25, which form one segment coil, are inserted in two slots 15 (FIG. 1, FIG. 2A), such that the coil wires 25 are arranged in the radial direction R.

Figure 4B:
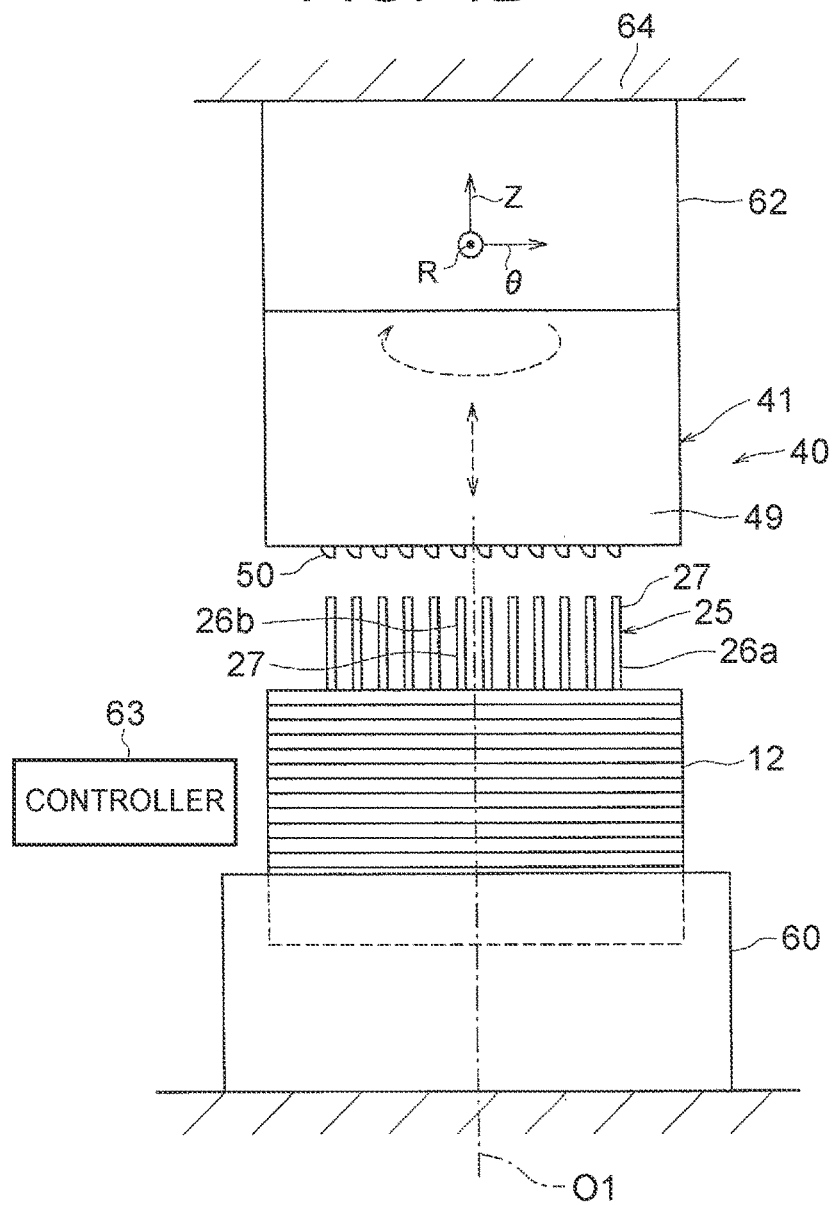
FIG. 4B is a view showing a condition where the stator core in which the coil wires are inserted and a jig for use in bending are opposed to each other, in a condition immediately before a bending step.

Next, a bending step of step S12 and a pressing step of step S14 as shown in FIG. 3 are successively carried out. In the bending step and pressing step, a bending device 40 (FIG. 4B) that constitutes a stator production apparatus is used. FIG. 4B shows a condition immediately before the bending step, in which the stator core 12 in which the coil wires 25 are inserted is opposed to a jig 41 for use in bending.

The bending device 40 includes a holder 60 that holds the stator core 12, jig 41, jig driver 62, and controller 63. The holder 60 grabs and holds a lower end portion of the stator core 12, in a condition where the first and second leg portions 26a, 26b of each of the coil wires 25 are inserted in the slots 15 (FIG. 2A) that are different between the first and second leg portions 26a, 26b. In this condition, the respective protruding portions 27 of the first and second leg portions 26a, 26b of each of the coil wires 25 protrude from the second axial end face (upper end face in FIG. 4B) of the stator core 12. At this time, the respective protruding portions 27 of the first and second leg portions 26a, 26b of each of the coil wires 25 protrude from the slots 15 that are different between the first and second leg portions 26a, 26b, in a direction parallel to the axial direction Z of the stator core 12. The holder 60 may include a plurality of arm portions disposed at a plurality of positions radially outwardly of the stator core 12 and extending in radial directions, and may be arranged to grab an outer circumferential surface of the stator core 12, by butting the arm portions against the outer circumferential surface of the stator core 12.

Figure 5A:
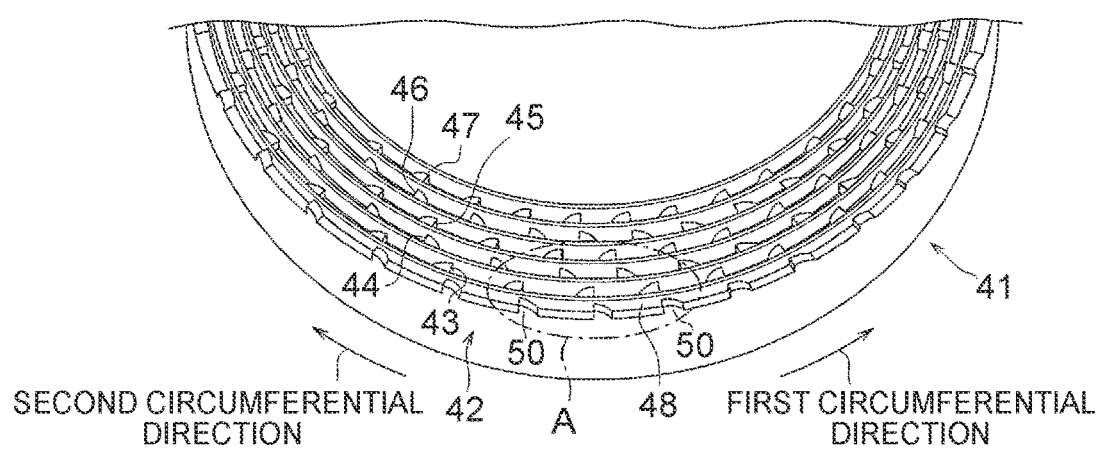
FIG. 5A is a perspective view showing a circumferential part of the jig for bending, as viewed from below the jig, with a part of the jig omitted.
Figure 5B:
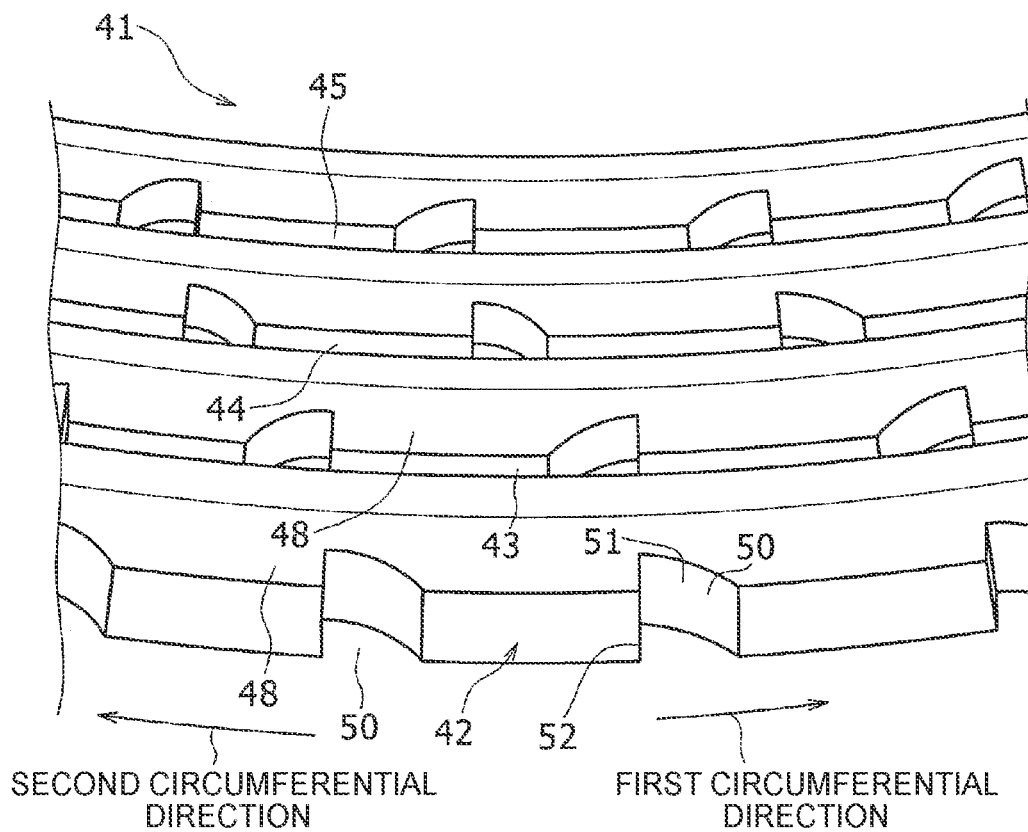
FIG. 5B is an enlarged view of "A" portion of FIG. 5A.
Figure 6:
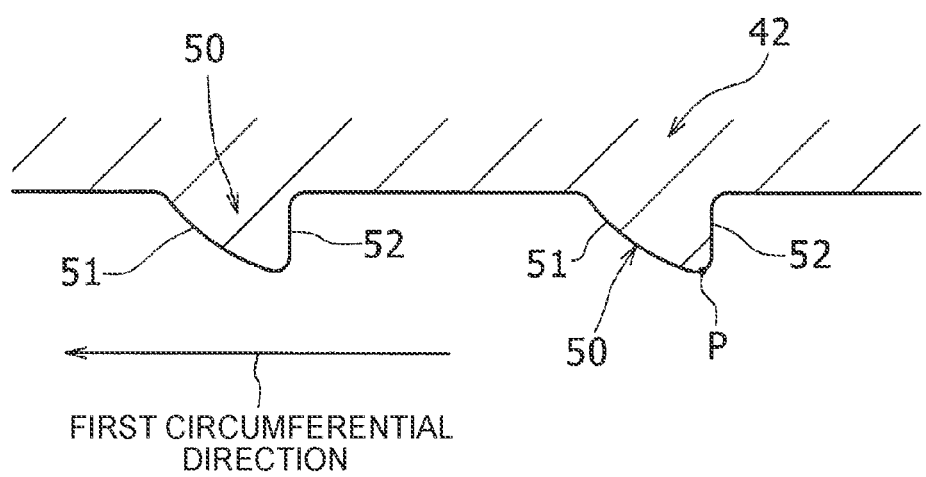
FIG. 6 is a cross-sectional view of a circumferential part of a ring portion that constitutes the jig for bending, in which the circumferential direction is extended to be the lateral direction.

The jig 41 is used for bending work, namely, used for bending the protruding portions 27 of the coil wires 25 in the circumferential direction of the stator core 12. For example, the jig 41 bends the protruding portions 27 of the first leg portions 26a, out of the first and second leg portions 26a, 26b, in a first circumferential direction of the stator core 12 shown in FIG. 2A, from a condition where the protruding portions 27 protrude from the slots 15 (FIG. 2A) in parallel with the axial direction of the stator core 12. FIG. 5A is a perspective view showing a circumferential part of the jig 41 as viewed from below the jig 41, with the remaining part omitted. FIG. 5B is an enlarged view of "A" portion in FIG. 5A. FIG. 6 is a cross-sectional view of a circumferential part of a ring portion 42 that constitutes the jig 41, such that the circumferential direction is extended to be the lateral direction.

The jig 41 is located above the stator core 12 held by the holder 60, and is supported on the lower side of a fixed member 64 via the jig driver 62 that will be described later. The jig 41 includes a support portion 49 disposed about the axis O1 located on an extension of the center axis of the stator core 12 and having a cylindrical portion, and a plurality of ring portions 42 to 47 (FIG. 5A) and a plurality of separators 48 (FIG. 5A, FIG. 5B) supported on the inner side of the support portion 49. The ring portions 42 to 47 are in the form of cylinders having different diameters, and are arranged in radial directions about a common center axis. The separators 48 are in the form of cylinders having different diameters, and are arranged between radially adjacent ones of the ring portions 42 to 47. The thickness of each of the ring portions 42 to 47 as measured in the radial direction is larger than the thickness of each of the separators 48 as measured in the radial direction. For example, six ring portions 42 to 47 and six separators 48 are provided. The ring portions 42 to 47 and separators 48 are disposed about the axis located on an extension of the center axis O1 (FIG. 4B) of the stator core 12.

Each of the ring portions 42 to 47 has a plurality of claw portions 50.

The claw portions 50 protrude at a plurality of positions of a lower end (closer to the stator core 12) of the ring portion 42 to 47, which positions are spaced at equal intervals in the circumferential direction. The ends of the separators 48 on the stator core 12 side protrude downward by a larger amount than the ends (closer to the stator core 12) of the ring portions 42 to 47 from which the claw portions 50 protrude. Thus, the separators 48 are placed between the claw portions 50 of radially adjacent ones of the ring portions 42 to 47.

Each of the ring portions 42 to 47 is moved, as a unit with the separator 48 that adjoins the radially inner side of the ring portion 42-47, in the axial direction and rotational direction, by means of the jig driver 62 that will be described below.

The jig driver 62 is located on the upper side of the jig 41. The jig driver 62 moves the ring portions 42 to 47 and the separators 48 in the axial direction and rotational direction. To this end, the jig driver 62 includes two first motors for rotational movement, two second motors for axial movement, power transmitting unit that transmits power of the first and second motors to the ring portions 42 to 47, and power transmission switching unit. For example, power of rotary shafts of the two first motors is transmitted to radially adjacent, two ring portions, via the power transmitting unit, so that the two ring portions are rotated in opposite directions. Meanwhile, power of rotary shafts of the two second motors is transmitted to the radially adjacent, two ring portions, via the power transmitting unit, so that the two ring portions are moved independently of each other in the axial direction.

The power transmission switching unit is configured to be able to switch the two ring portions to which the power of the two second motors and two first motors is transmitted, to other adjacent two ring portions. Further, the controller 63 controls each motor, power transmission switching unit, etc. of the jig driver 62. The controller 63 has a central processing unit (CPU) as a computing unit, and a storage unit, such as a random access memory (RAM) and a read-only memory (ROM). The CPU has the function of reading and executing programs stored in advance in the storage unit. The computing unit is only required to be able to implement functions by executing programs. Where the jig 41 includes six ring portions 42 to 47, for example, the two ring portions 42, 43 located in a radially outermost portion of the jig 41 move in the same axial direction and opposite rotational directions, and then, the two ring portions 44, 45 located in a radially middle portion move in the same axial direction and opposite rotational directions. Finally, the two ring portions 46, 47 located in a radially inner portion move in the same axial direction and opposite rotational directions.

By using the bending device 40 as described above, the protruding portions 27 of the coil wires 25 opposed to the underside of the ring portions 42 to 47 are successively subjected to bending work, for each set of two layers of protruding portions 27 located on two circumferences, adjacent to each other in the radial direction R. In this connection, the power transmission switching unit may be omitted, and two or more ring portions located at every other radial positions may be moved at the same time in the axial direction and rotational direction, by the first motor as one of the two first motors, and the second motor as one of the two second motors, via the power transmitting unit. Then, the remaining ring portions may be moved at the same time in the axial direction and rotational direction, by the remaining one of the two first motors and the remaining one of the two second motors, via the power transmitting unit. In the following description, the ring portions 42 to 47 are respectively referred to as first ring portion 42, second ring portion 43, third ring portion 44, fourth ring portion 45, fifth ring portion 46, and sixth ring portion 47, in this order as viewed from the outermost circumference toward the innermost circumference. The first, third and fifth ring portions 42, 44, 46 have the same configuration except that they have different diameters and circumferential lengths. The second, fourth, and sixth ring portions 43, 45, 47 also have the same configuration except that they have different diameters and circumferential lengths. The claw portions 50 of the first, third and fifth ring portions 42, 44, 46 and those of the second, fourth and sixth ring portions 43, 45, 47 are oriented in opposite directions. The first, third and fifth ring portions 42, 44, 46 are used for plastically deforming the protruding portions 27 of the first leg portions 26a, out of the first leg portions 26a and second leg portions 26b of the coil wires 25, by bending and pressing. The second, fourth, and sixth ring portions 43, 45, 47 are used for plastically deforming the protruding portions 27 of the second leg portions 26b, out of the first leg portions 26a and second leg portions 26b of the coil wires 25, by bending and pressing. In the following description, basically, the arrangement of the outermost first ring portion 42 for bending and pressing the first leg portions 26a will be described.

As shown in FIG. 5B and FIG. 6, each claw portion 50 of the first ring portion 42 has a first face 51 formed so as to face in a first circumferential direction of the jig 41, and a second face 52 formed so as to face in a second circumferential direction of the jig 41. The second circumferential direction is opposite to the first circumferential direction. As shown in FIG. 4B, the jig 41 is placed in a condition where it is opposed to the stator core 12 in which the coil wires 25 are inserted, such that the axis O1 of the jig 41 is located on an extension of the center axis of the stator core 12. In this condition, the first circumferential direction of the jig coincides with the first circumferential direction of the stator core, and the second circumferential direction of the jig coincides with the second circumferential direction of the stator core. As shown in FIG. 5B and FIG. 6, the first face 51 is a convex curved surface that has an arc-like shape in cross section and protrudes toward the stator core 12. The second face 52 is a flat surface perpendicular to the circumferential direction of the jig 41. The first face 51 and the second face 52 are connected at a lower end of the first ring portion 42, to provide a continuous surface.

Figure 7:
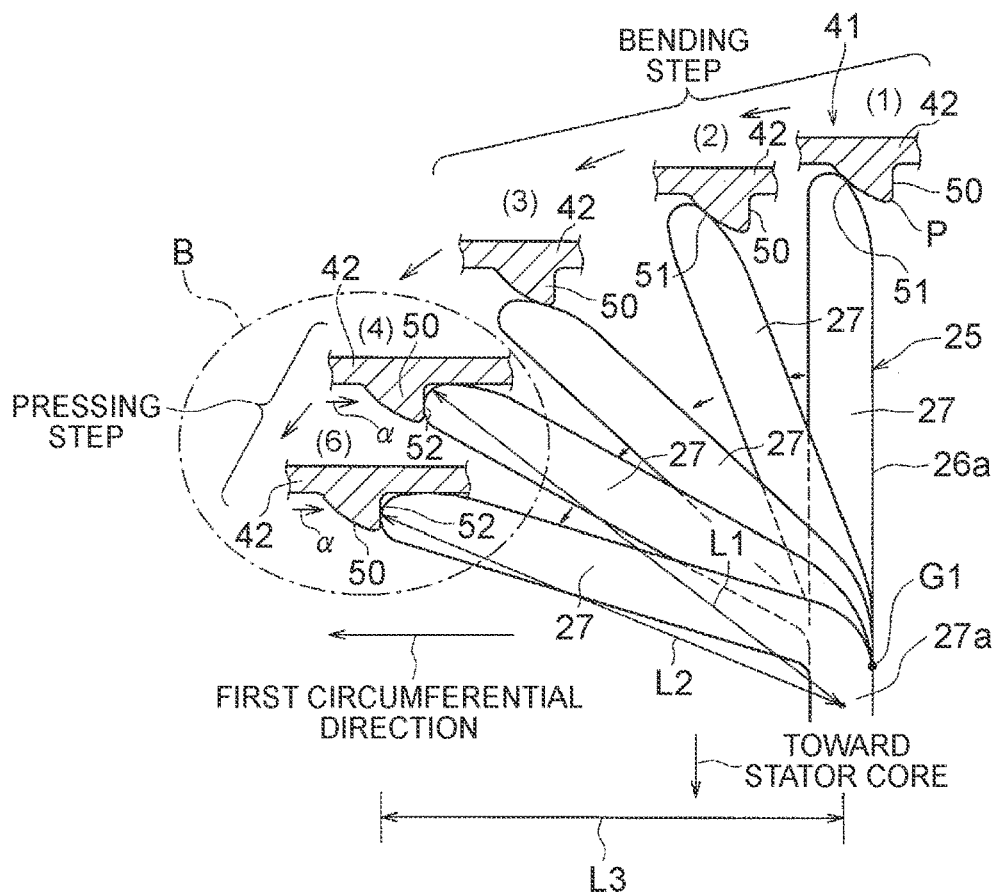
FIG. 7 is a view showing conditions in which the ring portion of the jig and a protruding portion of a coil wire move in a bending step and a pressing step.
Figure 8:
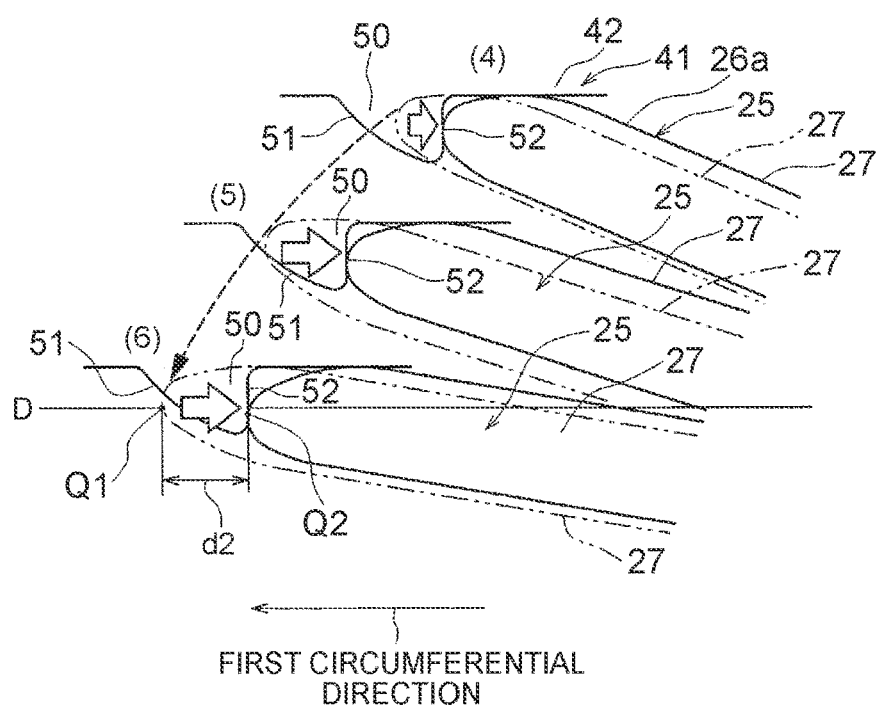
FIG. 8 is an enlarged view of "B" portion of FIG. 7, showing conditions in which the ring portion and the protruding portion of the coil wire move in the pressing step.

FIG. 7 shows how the ring portion 42 of the jig 41 and the protruding portion 27 of the first leg portion 26a of one of the coil wires 25 move relative to each other, in the bending step and pressing step of the embodiment. FIG. 8 is an enlarged view showing conditions where the first ring portion 42 and the protruding portion 27 of the first leg portion 26a move in the pressing step, in a "B" portion of FIG. 7. The controller 63 shown in FIG. 4B controls the jig driver 62, so as to bring the first face 51 of the claw portion 50 in the first ring portion 42 of the jig 41 into contact with a side face of a distal end portion in the protruding portion 27 of the first leg portion 26a of the coil wire 25, in the bending step, as shown in (1) to (3) of FIG. 7. In this condition, the controller 63 causes the first ring portion 42 to move in the first circumferential direction, while moving toward the stator core in the axial direction. As a result, the protruding portion 27 of the first leg portion 26a, which protrudes in parallel with the axial direction of the stator core from the slot, is bent in the first circumferential direction, at a proximal end portion G1 (FIG. 7) of the protruding portion 27 as a bending start point. At this time, a proximal end 27a of the protruding portion 27 is located at an outlet of the slot 15 at the second axial end (upper end in FIG. 1, FIG. 2A) of the stator core. Also, the proximal end 27a of the protruding portion 27 is located at a position corresponding to edges closer to the slot 15, of second axial end faces (upper end faces in FIG. 1, FIG. 2A) of the teeth 14 adjacent to the first leg portion 26a, in the protruding portion 27. For example, the protruding portion 27 is pressed against the edges closer to the slot 15, of the second axial end faces of the teeth 14, and is bent in the first circumferential direction, at the proximal end portion G1 of the protruding portion 27 as the bending start point.

Then, the controller 63 controls the jig driver 62, so as to move the first ring portion 42 in the first circumferential direction after (3) of FIG. 7, in a condition where the height position (vertical position in FIG. 7) as the axial position of the first ring portion 42 is kept constant. Then, the controller 63 moves the first ring portion 42 in the first circumferential direction, while moving it toward the stator core in the axial direction again. As a result, as shown in (4) of FIG. 7 and (4) of FIG. 8, the second face 52 of the claw portion 50 is brought into contact with a first circumferential end of the distal end portion of the protruding portion 27 of the first leg portion 26a, and the lower end face of the first ring portion 42 is brought into contact with the upper end of the distal end portion of the protruding portion 27. In this condition, the controller 63 moves the first ring portion 42 in the first circumferential direction while moving the same toward the stator core in the axial direction, so that the distal end of the protruding portion 27 becomes closer to the proximal end 27a of the protruding portion 27. Thus, after the initial period of the pressing step shown in (4) of FIG. 7, the protruding portion 27 is pressed from the distal end in the second circumferential direction, so that the bending angle at the proximal end portion of the protruding portion 27 is rapidly reduced, at the end of the pressing step shown in (6) of FIG. 7, as compared with that in the initial period. Consequently, a distance L2 between the distal end and proximal end 27a of the protruding portion 27 at the end of the pressing step shown in (6) of FIG. 7 is smaller than a distance L1 between the distal end and proximal end 27a of the protruding portion 27 in the initial period of the pressing step shown in (4) of FIG. 7.

Figure 9A:
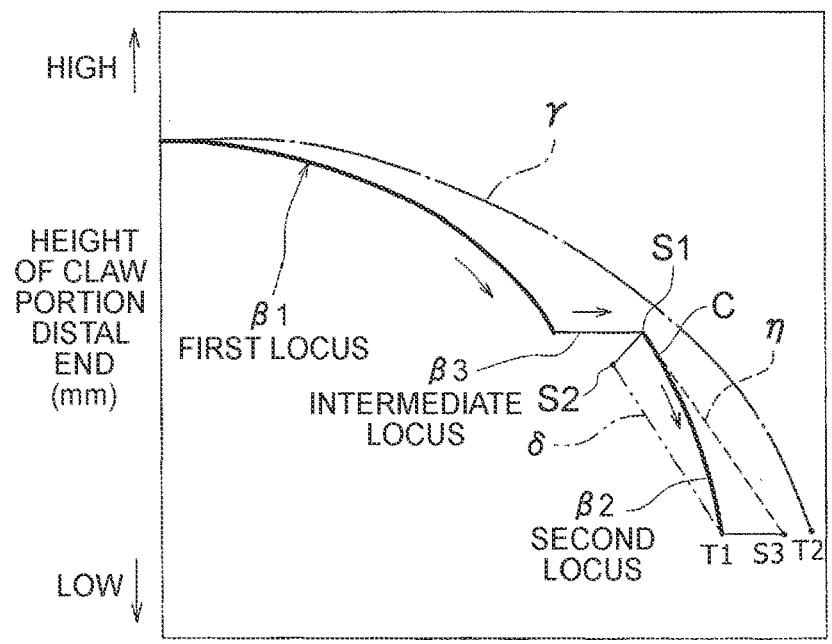
FIG. 9A is a view showing the movement locus of a distal end of a claw portion of the jig in the bending step and pressing step.

FIG. 9A shows the movement locus of a distal end P (FIG. 6) of the claw portion 50 of the jig 41 in the bending step and pressing step. From the movement locus, the loci of the claw portion 50 as a whole and the lower end face of the first ring portion 42 can be estimated. In FIG. 9A, the horizontal axis indicates the phase of the distal end P of the claw portion 50 of the first ring portion 42 in the first circumferential direction, with respect to a reference position, which phase is represented by the circumferential length (mm) from the reference position. Also, in FIG. 9A, the vertical axis indicates the height (mm) of the distal end P of the claw portion 50 of the first ring portion 42, as measured from a reference position.

The controller 63 (FIG. 4B) controls the jig driver 62 (FIG. 4B) as described above, so as to move the jig 41 relative to the stator core 12 along a first locus, toward the stator core, and then move the jig 41 along a second locus. At this time, the jig 41 becomes closer to the stator core in the bending step, such that the distal end P (FIG. 6) of the claw portion 50 of the first ring portion 42 moves relative to the stator core along the curve-like first locus indicated by a thick solid line β1 in FIG. 9A. With the jig 41 and the stator core moving relative to each other along the first locus, the protruding portion 27 of the first leg portion 26a is bent in the first circumferential direction of the stator core 12, at the proximal end portion of the protruding portion 27 as the bending start point, as will be described later. The bending step mentioned herein is a non-restrained bending step that will be described later.

Further, the jig 41 is controlled by the controller 63 to become closer to the stator core in the pressing step, such that the distal end P (FIG. 6) of the claw portion 50 of the first ring portion 42 moves relative to the stator core, along the curve-like second locus indicated by a thick solid line (32 in FIG. 9A. With the jig 41 and the stator core moving relative to each other along the second locus, the distal end of the protruding portion 27 of the coil wire 25 bent in the first circumferential direction is pressed to a final pressed position (which will be described later) as a circumferential position of the second face 52 of (6) of FIG. 7 and (6) of FIG. 8, in the second circumferential direction (direction of arrow a in FIG. 7) toward the proximal end. Also, with relative movements of the jig 41 and the stator core along the second locus, the protruding portion 27 of the coil wire 25 bent in the first circumferential direction is further bent in the first circumferential direction of the stator core 12, while being pressed at its distal end in the second circumferential direction of the stator core 12 toward the proximal end. At this time, the pressing step is a restrained bending step that will be described later. The height position of the distal end of the claw portion on each of the first locus and the second locus shown in FIG. 9A is expressed as a function using the phase of the distal end of the claw portion as a variable.

In FIG. 9A, an intermediate locus in the form of a straight line indicated by a thin solid line (33 is set between the first locus and the second locus. On the intermediate locus, the distal end of the claw portion 50 moves in the first circumferential direction while its height position is kept constant. The intermediate locus is formed at the time when the bending step ends, namely, when the distal end P of the claw portion 50 moves in the first circumferential direction, without pressing the distal end portion of the protruding portion 27. With the intermediate locus thus provided, the circumferential position of the distal end P of the claw portion 50 switches from a position on one side of a first circumferential end of the protruding portion 27, which faces in the second circumferential direction, to a position on the other side facing in the first circumferential direction. The above-mentioned first circumferential end faces in the first circumferential direction. The switching corresponds to the case where the claw portion 50 moves to the left while the height position of the claw portion 50 is kept constant in (3) of FIG. 7. When the claw portion 50 moves along the intermediate locus, neither the bending step nor the pressing step is carried out.

Further, in FIG. 9A, one-dot chain line "γ" indicates a non-restrained locus as a locus of the distal end of the claw portion 50 in the case where the protruding portion 27 is continuously bent in the first circumferential direction in a non-restrained condition, as a comparative example. The "non-restrained condition" is a condition where the distal end portion of the protruding portion 27 of the coil wire 25 is allowed to freely move in the first circumferential direction. As shown in FIG. 9A, an end position T1 of the second locus β2 as the locus of the claw portion 50 of this embodiment is behind an end position T2 of the non-restrained locus γ in the first circumferential direction or advanced from the end position T2 in the second circumferential direction.

The bending step and pressing step are performed using the bending device 40 (FIG. 4B) as described above, and the pressing step is performed after the bending step. Initially, in the bending step, the stator core 12 is held by the holder 60, such that the protruding portions 27 of the coil wires 25 protrude upward in parallel with the axial direction of the stator core, from the second axial end face (upper end face in FIG. 4B) of the stator core 12, as shown in FIG. 4B. Then, the jig 41 is placed above the stator core 12, such that the jig 41 faces the protruding portions 27 of the coil wires 25.

Then, the jig 41 is positioned such that the first face 51 of each claw portion 50 of the first ring portion 42 contacts with the distal end portion of the corresponding protruding portion 27, as shown in (1) to (3) of FIG. 7. On the other hand, the first ring portion 42 is not in contact with the first circumferential end of the distal end portion of the protruding portion 27. In this condition, the first ring portion 42 is moved toward the stator core 12 in the axial direction while being moved in the first circumferential direction, so that the protruding portion 27 is bent in the first circumferential direction. At this time, the distal end P of the claw portion 50 is moved relative to the stator core 12 along the first locus β1 (FIG. 9A). As a result, in the bending step, the protruding portion 27 of the first leg portion 26a, out of the first and second leg portions 26a, 26b (FIG. 2B) of the coil wire 25, is bent in the first circumferential direction, at the proximal end portion of the protruding portion 27 as a bending start point. At this time, the position of contact of the claw portion 50 with the protruding portion 27 gradually moves from a position in the vicinity of the proximal end of the first face 51 of the claw portion 50 to a position in the vicinity of the distal end of the first face 51, as shown in (1) to (3) of FIG. 7. In some of the radially outermost protruding portions 27 bent by the first ring portion 42, out of the protruding portions 27 that protrude from the second axial end face of the stator core 12, both the first and second leg portions 26a, 26b of the coil wires 25 are bent in the first circumferential direction, so as to connect adjacent ones of the segment coils. This bending step is a non-retrained bending step in which the protruding portions 27 of the coil wires 25 are bent in the first circumferential direction, in a non-retrained condition in which the distal end portions of the protruding portions 27 are allowed to freely move in the first circumferential direction.

Next, in the pressing step, the jig 41 is positioned such that the second face 52 of each claw portion 50 of the first ring portion 42 contacts with the first circumferential end of the distal end portion of the corresponding protruding portion 27, and the lower end face of the first ring portion 42 contacts with the axial end of the distal end portion of the protruding portion 27, as shown in (4), (6) of FIG. 7 and (4) to (6) of FIG. 8. Then, in this condition, the first ring portion 42 is moved toward the stator core 12 in the axial direction, while being moved in the first circumferential direction, so that the distal end of the protruding portion 27 is pressed by the claw portion 50 of the first ring portion 42 in the second circumferential direction, and at the same time, the protruding portion 27 is bent by the lower end face of the first ring portion 42 in the first circumferential direction of the stator core. At this time, with regard to each of the protruding portions 27 of the first leg portions 26a of the radially outermost coil wires 25, the circumferential position of the second face 52 of the claw portion 50 in (6) of FIG. 7 and (6) of FIG. 8 is the final pressed position at which the second face 52 is spaced by the same predetermined amount L3 (FIG. 7) from the proximal end position of the protruding portion 27 as a reference position, in the first circumferential direction. In the pressing step, the distal end of the protruding portion 27 is pressed in the second circumferential direction, to reach this position as the final pressed position. With regard to a plurality of protruding portions 27, pressing the protruding portions 27 to the final pressed positions spaced by the same predetermined amount L3 from the proximal end positions of the protruding portions 27 is achieved by pressing the protruding portions 27 in the second circumferential direction using the claw portions 50 located at equal circumferential intervals on the first ring portion 42 as a common jig for the protruding portions 27. This bending step is a retrained bending step in which the protruding portions 27 are bent in the first circumferential direction, in a restrained condition in which free movements of the distal end portions of the protruding portions 27 in the first circumferential direction are restricted. Through the bending step and pressing step as described above, the protruding portions 27 are plastically deformed. At this time, the position of the distal end P of each claw portion 50 is moved relative to the stator core 12 along the second locus β2 (FIG. 9A). In this case, the protruding portion 27 may be pressed by the lower surface of the first ring portion 42, from a point in time when the distal end P of the claw portion 50 reaches a given point on the second locus β2 after it starts moving on the second locus β2 (e.g., a point in time at which the distal end of the claw portion 50 is located at point C in FIG. 9A). Then, the first circumferential end of the protruding portion 27 may be subsequently pressed by the second face 52. Thus, in the pressing step, the protruding portion 27 bent in the first circumferential direction is further bent in the first circumferential direction, while being pressed at its distal end in the second circumferential direction toward the proximal end. The bending step and pressing step as described above make it possible to reduce an influence of variations in the length of the coil wires, and improve the accuracy with which the distal ends of the coil wires are positioned in the circumferential direction.

While the above description is concerned with the case where the protruding portions 27 of the first leg portions 26a located on the outermost circumference are bent by the first ring portion 42, the remaining protruding portions are also bent in a similar manner by the second through sixth ring portions 43 to 47. At this time, the third and fifth ring portions 44, 46 move toward the stator core in the axial direction, while moving in the first circumferential direction, in the same manner as the first ring portion 42. As a result, the protruding portions of the first leg portions 26a on the circumferences other than the outermost circumference are bent and pressed, in the same manner as the first leg portions 26a on the outermost circumference. On the other hand, the second, fourth, and sixth ring portions 43, 45, 47 move toward the stator core in the axial direction, while moving in the second circumferential direction opposite to the first circumferential direction in which the first ring portion 42 moves. As a result, in the bending step, the protruding portions 27 of the second leg portions 26b are bent in the second circumferential direction, by the second, fourth and sixth ring portions 43, 45, 47. Further, in the pressing step, the protruding portions 27 bent in the second circumferential direction are further bent in the second circumferential direction, while being pressed at their distal ends in the first circumferential direction, namely, toward the proximal ends.

Figure 9B:
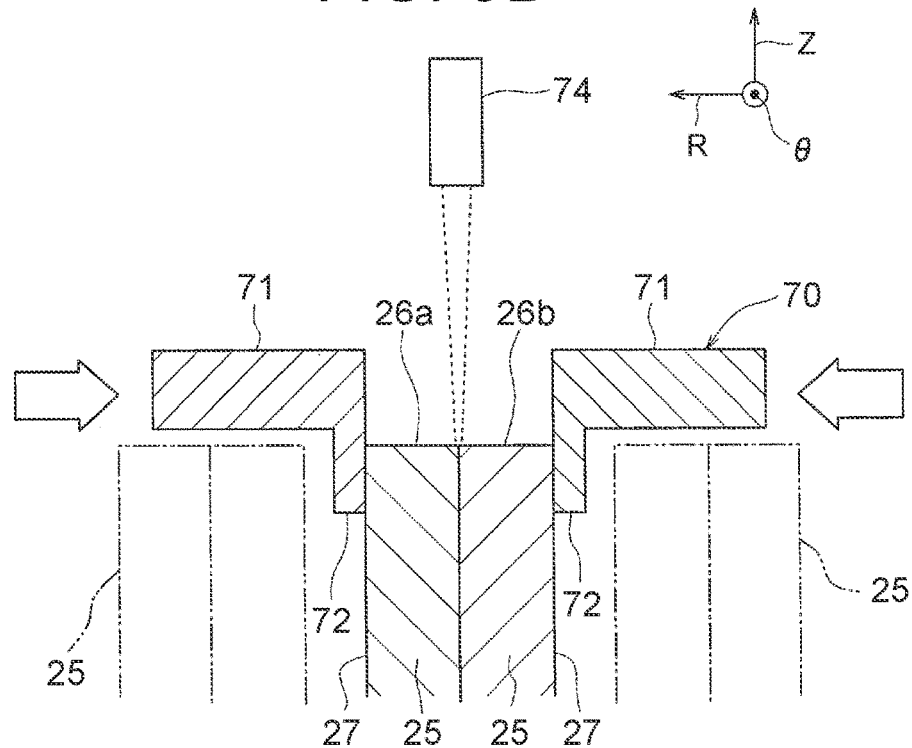
FIG. 9B is a cross-sectional view showing a condition in which adjacent coil wires are welded in a welding step, after being fixed to a welding fixing device.

After the pressing step ends, a welding step is performed, as shown in step S16 of FIG. 3. In this step, after the jig 41 is detached from the protruding portions 27 of the coil wires 25, distal end portions of the protruding portions 27 located adjacent to each other in the radial direction are fixed in a condition where they are sandwiched by a welding fixing device 70 (FIG. 9B). Since the protruding portions 27 are plastically deformed through the bending process and pressing process as described above, the distal ends of the coil wires are positioned in the circumferential direction with improved accuracy, even after the jig 41 is detached from the protruding portions 27 as described above.

FIG. 9B is a cross-sectional view showing a condition where the coil wires 25 located adjacent to each other are welded to each other, after being fixed to the welding fixing device 70, in the welding step. The welding fixing device 70 has two holding jigs 71 for positioning the coil wires 25 in the radial direction R. Jig projections 72 that protrude toward the stator core (downward in FIG. 9B) are formed at distal end portions of the two holding jigs 71. The two protruding portions 27 adjacent to each other in the radial direction R are fixed in a condition where they are sandwiched by the jig projections 72 of the two holding jigs 71 from the opposite sides in the radial direction R, to contact with each other. In this condition, a contact portion of the two protruding portions 27 adjacent to each other in the radial direction R is irradiated with an energy beam emitted from above by a laser welder 74, so that the distal end portions of the two protruding portions 27 are welded to each other. The welding step is not limited to the case where laser welding is performed, but other welding methods may be employed. After the above welding step, the neutral bus bar 34 (FIG. 1) is welded to end portions of the corresponding protruding portions 27, for example, so that the stator 10 (FIG. 1) is formed.

The stator production method of the above embodiment includes the pressing step after the bending step, and, in the pressing step, the distal ends of the protruding portions 27 of the coil wires 25 bent in the first circumferential direction are pressed in the second circumferential direction toward the proximal ends. Further, in the production apparatus of the stator 10, the jig 41 moves relative to the stator core 12 along the first locus β1 (FIG. 9A), and then moves relative to the stator core 12 along the second locus β2 (FIG. 9A). The protruding portions 27 of the coil wires 25 are bent in the first circumferential direction through relative movements along the first locus β1, and the distal ends of the protruding portions 27 are pressed in the second circumferential direction through relative movements along the second locus β2. Also, in the pressing step, or through relative movements of the jig 41 and the stator core 12 along the second locus β2, the distal ends of the protruding portions 27 are pressed in the second circumferential direction, so as to reach the final pressed positions that are spaced from the proximal end positions of the protruding portions 27 of the first leg portions 26a by the predetermined amount L3 (FIG. 7) in the first circumferential direction. Thus, in the case where the protruding portions 27 located at the same positions in production of a plurality of stators 10 are considered, the protruding portions 27 are bent such that the amount of deformation at the proximal end differs according to differences in the length due to variations in the protruding portions 27. More specifically, the protruding portion 27 is bent by a large amount at the proximal end when it is longer than a given length, and the protruding portion 27 is bent by a small amount at the proximal end when it is shorter than the given length. Therefore, in a condition where the protruding portions 27 of the coil wires 25 that protrude from the end face of the stator core 12 are bent in the circumferential direction, it is possible to reduce an influence of variations in the length of the coil wires, and improve the accuracy with which the distal ends of the coil wires 25 are positioned in the circumferential direction.

Also, since the pressing step is conducted after the bending step, the distal end portion of the protruding portion 27 of the coil wire 25 is prevented from being bent in the opposite direction to its proximal end portion, unlike the case where the bending operation to bend the protruding portion of the coil wire in the first circumferential direction, at the proximal end portion as a bending start point, is started at the same time as pressing of the distal end of the protruding portion in the second circumferential direction. Thus, sufficient accuracy in the shape of the distal end portions of the coil wires 25 is likely to be ensured. Accordingly, it is possible to improve the accuracy in positioning the distal ends of the coil wires 25, in a condition where the protruding portions 27 of the coil wires 25 which protrude from the end face of the stator core 12 are bent in the circumferential direction.

Further, in the pressing step of the stator production method of the embodiment, the protruding portion 27 bent in the first circumferential direction is further bent in the first circumferential direction, while being pressed at its distal end in the second circumferential direction. Thus, the time required to bend the protruding portion of the coil wire can be shortened, as compared with the case where the pressing step involves only pressing of the protruding portion of the coil wire in the second circumferential direction.

In the stator production apparatus of the embodiment, through relative movements of the jig 41 and the stator core 12 along the second locus β2 (FIG. 9A), the protruding portion 27 bent in the first circumferential direction is further bent in the first circumferential direction, while being pressed at its distal end in the second circumferential direction. Thus, the time required to bend the protruding portion 27 of the coil wire 25 can be shortened, as compared with the case where the protruding portion of the coil wire is only pressed in the second circumferential direction through relative movements along the second locus.

Figure 10:
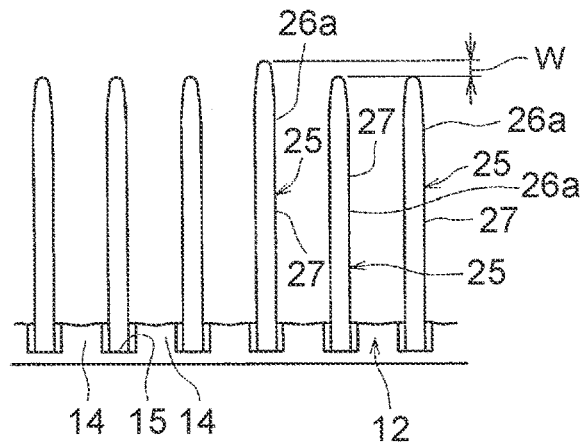
FIG. 10 is a view showing a condition where there are variations in distal ends of a plurality of coil wires, in the case where the coil wires protrude from an axial end face of the stator core.

FIG. 10 shows a condition where there are variations in distal ends of a plurality of coil wires 25, in the case where the coil wires 25 protrude from an axial end face of the stator core 12. FIG. 10 shows protruding portions 27 of the first leg portions 26a of the coil wires 25, which are located on the outermost circumference and are supposed to be bent by the first ring portion 42 (FIG. 5B) of the jig 41 (FIG. 5B). As shown in FIG. 10, variations may arise in the axial positions of the distal ends of the coil wires 25, due to variations in the length of the coil wires 25, variations in assembling the coil wires 25 with the stator core 12, and so forth. In FIG. 10, "W" denotes the largest difference in the length between the axial positions of the distal ends of any given two of the coil wires 25.

Figure 11A:
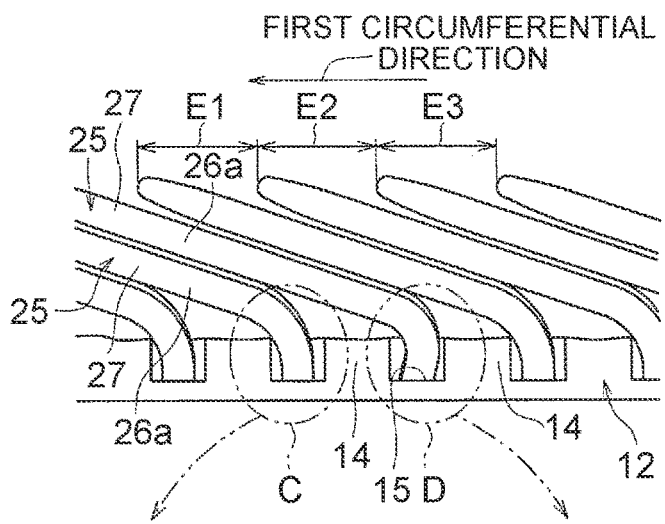
FIG. 11A is a view showing intervals of the distal ends of the coil wires, in the case where the coil wires are bent according to the production method of the embodiment.
Figure 11B:
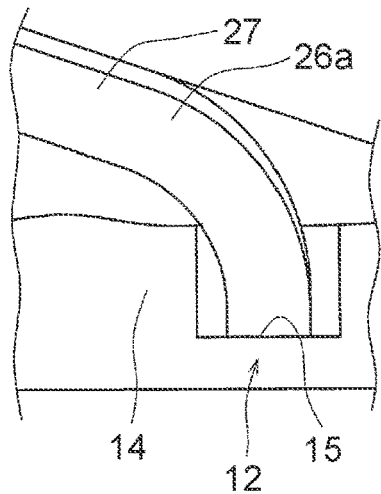
FIG. 11B is an enlarged view of "C" portion of FIG. 11A.
Figure 11C:
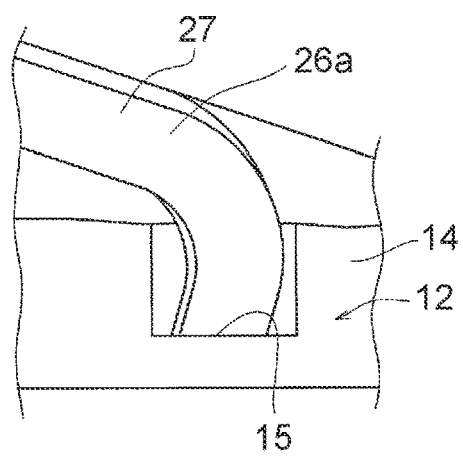
FIG. 11C is an enlarged view of "D" portion of FIG. 11A.

FIG. 11A shows intervals of the distal ends of the coil wires 25, when the first leg portions 26a of the coil wires 25 are bent according to the production method of the embodiment. FIG. 11B is an enlarged view of a "C" portion of FIG. 11A, and FIG. 11C is an enlarged view of a "D" portion of FIG. 11A. When the protruding portion 27 of the first leg portion 26a of each coil wire 25 is subjected to the pressing process according to the production method of the embodiment, the protruding portion 27 is bent in the first circumferential direction, while being pressed at its distal end in the second circumferential direction. When there are variations in the distal ends of the coil wires 25 as shown in FIG. 10, the pressing process is performed on the protruding portions 27 according to the production method of the embodiment, so that the amount of deformation at the proximal end becomes larger as the length of the protruding portion 27 is larger. For example, as shown in FIG. 11C, the protruding portion 27 is plastically deformed so as to be bent largely at the proximal end, and the radius of curvature of the bent portion at the proximal end is reduced.

On the other hand, the amount of deformation at the proximal end is smaller as the length of the protruding portion 27 is smaller. For example, as shown in FIG. 11B, the amount of deformation of the protruding portion 27 at the proximal end is reduced, and the radius of curvature of the bent portion at the proximal end is increased. Through this pressing step, the protruding portions 27 are bent such that the amounts of deformation differ according to differences in the length; therefore, the distal ends of the coil wires 25 are likely to be located at positions that are spaced at equal intervals in the circumferential direction of the stator core 12. It is thus possible to reduce the influence of variations in the length of the coil wires 25, and improve the accuracy in positioning the distal ends of the coil wires 25 in the circumferential direction. Consequently, as shown in FIG. 11A, the intervals E1, E2, E3 between the distal ends of the coil wires 25 in the circumferential direction can be made substantially equal.

Further, in the bending step of the stator production method according to the embodiment, the jig 41 is located so as to face the protruding portions 27 that protrude from the other axial end face of the stator core 12. Then, the first ring portion 42 of the jig 41 is brought into contact with distal end portions of the protruding portions 27 on the outermost circumference. In a condition where the first ring portion 42 is not in contact with the first circumferential ends of the distal end portions of the protruding portions 27, the first ring portion 42 is moved toward the stator core in the axial direction while being moved in the first circumferential direction, so that the protruding portions 27 are bent in the first circumferential direction. Also, in the pressing step, in a condition where the axial ends and first circumferential ends of the distal end portions of the protruding portions 27 are in contact with the first ring portion 42, the first ring portion 42 is moved toward the stator core 12 in the axial direction while being moved in the first circumferential direction. In this manner, the first ring portion 42 bends the protruding portions 27 in the first circumferential direction, while pressing their distal ends in the second circumferential direction. Thus, since the bending step and pressing step are performed using the same first ring portion 42, operation to deform the coil wires 25 is more easily performed in a continuous manner.

Further, the controller 63 controls the jig driver 62 so as to move the first ring portion 42 in the first circumferential direction while moving the same toward the stator core in the axial direction, in a condition where the first faces 51 of the claw portions 50 of the first ring portion 42 are in contact with side faces of the protruding portions 27 of the first leg portions 26a. Then, the controller 63 controls the jig driver 62 so as to move the first ring portion 42 in the first circumferential direction while moving the same toward the stator core in the axial direction, so that the distal ends of the protruding portions 27 become closer to the proximal ends, in a condition where the second faces 52 of the claw portions 50 are in contact with the first circumferential ends of the protruding portions 27. Thus, operation to bend the protruding portions 27 in the circumferential direction in a condition where the first faces 51 of the claw portions 50 are in contact with the protruding portions 27, and operation to bend the protruding portions 27 in the circumferential direction while pressing their distal ends toward the proximal ends, in a condition where the distal end portions of the protruding portions 27 are restrained by the second faces 52 of the claw portions 50, are easily performed in a continuous manner.

In the above embodiment, the restrained bending step may be performed in the following manner. Initially, with regard to each of the protruding portions 27 bent in the circumferential direction in the bending step, suppose that the protruding portion 27 is continuously bent in the first circumferential direction while the distal end of the protruding portion 27 is moved in a non-restrained condition, to a predetermined position D in the axial direction, as indicated by two-dot chain lines in (4) to (6) of FIG. 8. Then, the position reached by the distal end of the protruding portion 27 is set as a virtual distal end position Q1. Then, the protruding portion 27 is bent in the first circumferential direction while its distal end is moved to the predetermined position D in the axial direction, in a condition where the distal end portion of the protruding portion 27 is restrained on the first circumferential side, so that the distal end of the protruding portion 27 reaches position Q2 that is spaced by a second predetermined distance d2 in the second circumferential direction, from the virtual distal end position Q1.

With the above arrangement, too, it is possible to reduce the influence of variations in the length of the coil wires, and improve the accuracy with which the distal ends of the coil wires are positioned in the circumferential direction, in a condition where the protruding portions 27 that protrude from the end face of the stator core are bent in the circumferential direction, as in the embodiment as described above. Also, sufficient accuracy in the shape of the distal end portions of the coil wires is likely to be ensured.

In FIG. 9A, "bending-after-pressing locus" is indicated by a two-dot chain line δ and "pressing-after-bending locus" is indicated by a broken line η, as other examples of the locus of the distal end position of the claw portion 50 in the bending step and the pressing step. In another example using the bending-after-pressing locus of the two-dot chain line δ, the claw portion 50 of the ring portion of the jig 41 is moved relative to the stator core, along the first locus indicated by the thick solid line β1, and the intermediate locus indicated by the thin solid line P3, as in the case where the second locus β2 is used. Then, the claw portion 50 is moved relative to the stator core, along the bending-after-pressing locus of the two-dot chain line δ. In this case, the distal end of the claw portion 50 moves along a generally straight line in the second circumferential direction, toward the stator core in the axial direction, from the end position S1 of the intermediate locus to position S2 on the bending-after-pressing locus δ. As a result, the protruding portion 27 of the coil wire 25 is bent toward the stator core, while its distal end is largely pressed by the second face 52 of the claw portion 50 in the second circumferential direction. At this time, the "pressing step" is performed on the protruding portion 27, such that the protruding portion 27 is bent in the first circumferential direction, while its distal end is pressed in the second circumferential direction.

Then, the distal end of the claw portion 50 moves from the position S2 to the end position T1 on the bending-after-pressing locus δ, so that the "second bending step" is performed, namely, the protruding portion 27 of the coil wire 25 is bent in the first circumferential direction, by the lower end face of the ring portion at a different position from the claw portion 50. Since the end position T1 of the bending-after-pressing locus δ is the end position T1 of the second locus, the protruding portion 27 is in a condition where its distal end is pressed toward the proximal end, as in the arrangement using the second locus β2. Thus, in the arrangement using the bending-after-pressing locus δ, too, the distal ends of the coil wires 25 can be positioned in the circumferential direction with improved accuracy, as in the arrangement using the second locus β2.

On the other hand, in another example using the pressing-after-bending locus indicated by the broken line η in FIG. 9A, the claw portion 50 of the ring portion of the jig 41 is moved relative to the stator core, along the first locus indicated by the thick solid line β1, and the intermediate locus indicated by the thin solid line β3. Then, the claw portion 50 is moved relative to the stator core, along the pressing-after-bending locus of the broken line η. In this case, the distal end of the claw portion 50 moves along a generally straight line in the first circumferential direction, toward the stator core in the axial direction, from the end position S1 of the intermediate locus toward position S3 on the pressing-after-bending locus η. In this manner, the "second bending step" is performed, such that the protruding portion 27 of the coil wire 25 is bent in the first circumferential direction, by the lower end face of the ring portion at a different position from the claw portion 50. The position S3 on the pressing-after-bending locus η is the same in terms of the height position as the end position T1 of the second locus β2, and is shifted from the end position T1 in the first circumferential direction. Further, the pressing step is performed by moving the distal end of the claw portion 50 from the position S3 to the end position T1, in a condition where the height position is kept constant. In the pressing step, the distal end of the protruding portion 27 of the coil wire 25 is pressed in the second circumferential direction, but, basically, the protruding portion 27 is not bent in the first circumferential direction. With this arrangement using the pressing-after-bending locus η, the distal ends of the coil wires 25 can be positioned in the circumferential direction with improved accuracy.

Figure 12:
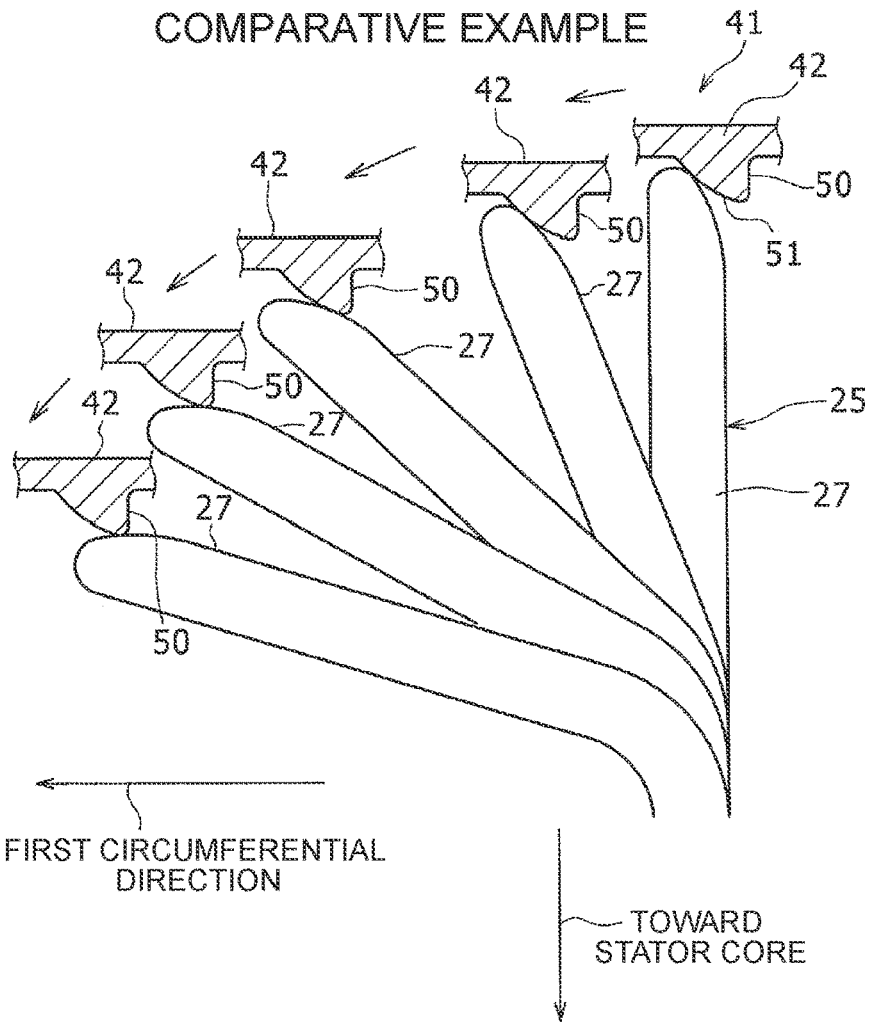
FIG. 12 is a view showing conditions in which a jig and a protruding portion of a coil wire move when the coil wire is bent, according to a rotating electric machine stator production method of a comparative example.
Figure 13:
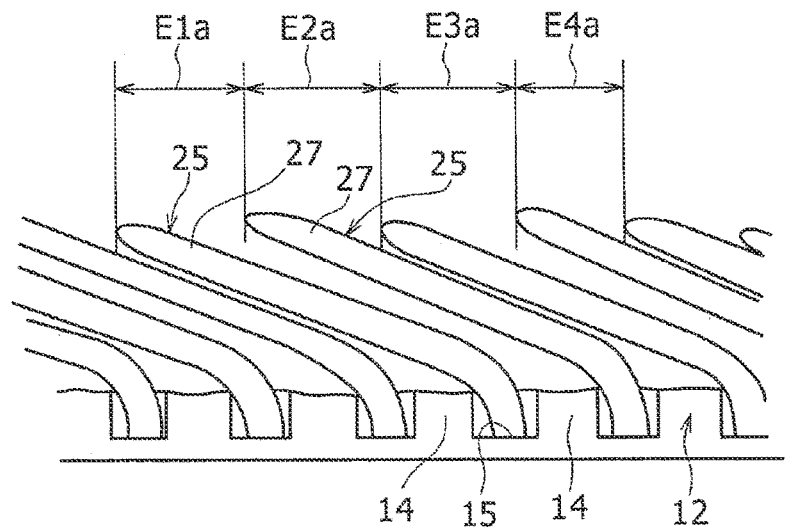
FIG. 13 is a view showing intervals of distal ends of coil wires, in the case where the coil wires are bent according to the production method of the comparative example.

FIG. 12 shows a condition where the jig 41 and the protruding portion 27 of each coil wire 25 move, in the case where the coil wires 25 are bent according to a stator production method of a comparative example. FIG. 13 shows intervals of distal ends of a plurality of coil wires 25, in the case where the coil wires 25 are bent according to the production method of the comparative example.

In the production method of the comparative example shown in FIG. 12, the protruding portion 27 of each coil wire 25 is continuously bent in the first circumferential direction, solely by the bending step, using the first ring portion 42 of the jig 41 shown in FIG. 4B to FIG. 6. At this time, the protruding portion 27 of the coil wire 25 is gradually bent in the first circumferential direction, in a condition where the distal end portion of the protruding portion 27 is in contact with the first face 51 of the corresponding claw portion 50 of the first ring portion 42. In this bending step, the protruding portion 27 is in a non-restrained state in which the distal end portion of the protruding portion 27 is allowed to freely move in the first circumferential direction, without being pressed at its distal end in the second circumferential direction.

When the protruding portions 27 of the coil wires 25, in which there are variations in the distal end positions as shown in FIG. 10, are subjected to the bending process, according to the production method of the comparative example, the protruding portions 27 are simply bent in the first circumferential direction. As a result, as shown in FIG. 13, the accuracy with which the distal ends of the protruding portions 27 are positioned is reduced, and the intervals E1a, E2a, E3a, E4a are likely to be uneven or unequal.

Figure 14:
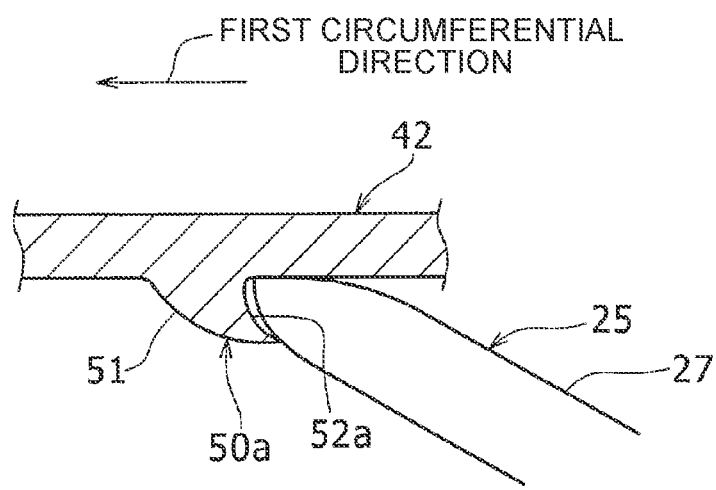
FIG. 14 is a view corresponding to FIG. 6, showing a claw portion of another example of the embodiment of the disclosure and a coil wire.
Figure 15:
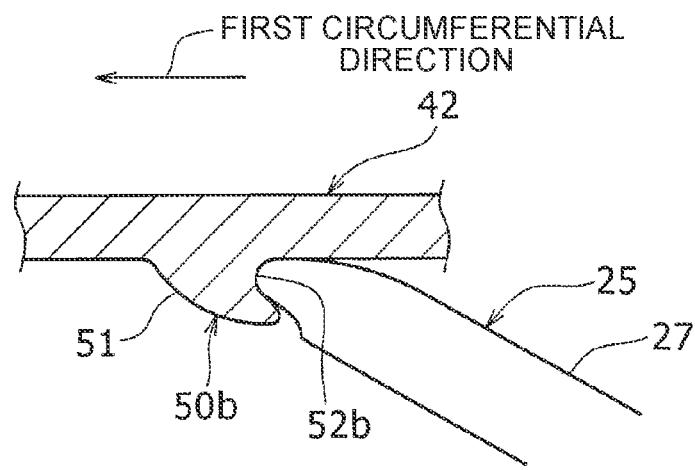
FIG. 15 is a view corresponding to FIG. 6, showing a claw portion of a further example of the embodiment of the disclosure and a coil wire.

FIG. 14 and FIG. 15, which correspond to FIG. 6, show claw portions 50a, 50b and a coil wire 25 in other examples of the embodiment. In the two other examples shown in FIG. 14 and FIG. 15, the claw portion 50a, 50b has a first face 51 as a convex face formed so as to face in the first circumferential direction of the jig 41, and a second face 52a, 52b as a concave face that is formed so as to face in the second circumferential direction of the jig 41, and is recessed in the first circumferential direction. In the pressing step, the second face 52a, 52b of the claw portion 50a, 50b is in contact with a circumferential end of the protruding portion 27 of the coil wire 25. Then, in this condition, the first ring portion 42 moves in the first circumferential direction while moving toward the stator core (downward in FIG. 14, FIG. 15) in the axial direction, so as to bring the distal end of the protruding portion 27 closer to the proximal end, so that the protruding portion 27 is bent in the first circumferential direction.

In the example shown in FIG. 14, a distal end portion of the claw portion 50a is pointed in the second circumferential direction, and the distal end portion abuts against the circumferential end of the protruding portion 27. In the example shown in FIG. 15, a distal end portion of the claw portion 50b is rounded, and a distal end portion of the protruding portion 27 having an arc-like shape in cross section abuts against a concave inner surface of the second face 52b having an arc-like shape in cross section. At this time, the cross-sectional shape of the distal end portion of the protruding portion 27 substantially coincides with that of the concave portion of the claw portion 50b. Other arrangements and functions in the examples shown in FIG. 14 and FIG. 15 are similar to those of the embodiment described using FIG. 1 through FIG. 11C.

In the above description, each ring portion included in the jig has a plurality of claw portions. However, the disclosure is not limited to this arrangement, but the jig may include a rotary member from which wall portions in the form of thin plates protrude. The wall portions extend in radial directions from a plurality of circumferential positions on an end face of the rotary member facing the stator core. In this case, in the pressing step, for example, the rotary member moves in the axial direction and the first circumferential direction so as to bend the protruding portions of the coil wires in the first circumferential direction, while the wall portions, instead of the claw portions, press the protruding portions of the coil wires in the second circumferential direction.

In the stator core, ring-like stator cuff supports made of resin may be disposed on an a second axial end face of the stator core from which protruding portions as distal end portions of coil wires protrude. The stator cuff supports have pillar portions at a plurality of circumferential positions corresponding to a plurality of teeth of the stator, and radially inner ends and radially outer ends of the pillar portions are connected by a radially inner ring and a radially outer ring, respectively. The protruding portions of the coil wires are bent in the circumferential direction, at their proximal end portions contacting with circumferential ends of the pillar portions as bending start points, as positions corresponding to slot-side ends on the other axial end faces of the teeth.

In the illustrated embodiment, in the bending step and pressing step, the ring portions of the jig are moved in the circumferential direction and axial direction. Meanwhile, the holder that holds the stator core may be moved in the circumferential direction and axial direction, in a condition where the jig is fixed, so that the jig is moved relative to the stator core along the first locus in the bending step, and the jig is moved relative to the stator core along the second locus in the pressing step. At this time, the stator core is rotated, in a condition where the protruding portions of the coil wires are in contact with the ring portions, but the coil wires can be bent only in one direction corresponding to the rotating direction of the stator core. Thus, in the bending step and pressing step, every other ring portions arranged in the radial direction, out of the ring portions included in the jig, are projected toward the stator core, further than the remaining ring portions. Then, by moving the holder while rotating it in one direction, protruding portions located on every other circumferences, out of a plurality of protruding portions of the coil wires, are bent by the projected ring portions. Then, the remaining every other ring portions of the jig are projected toward the stator core, further than the other ring portions, and the projecting portions of the corresponding coil wires are bent by the ring portions while the holder is rotated in the opposite direction. In this manner, all of the protruding portions are subjected to bending.

While the case where the stator coil is wound by distributed winding on the stator core has been described above, the stator coil may be wound by concentrated winding on the stator core. In this case, in the insertion step, a U-shaped coil wire is inserted in two slots located on the opposite sides of one tooth, such that the coil wire extends across a first axial end face of one tooth, and protruding portions of two leg portions protrude from a second axial end face of the stator core.

What is claimed is:

1. A method of producing a rotating electric machine stator including a stator core having a plurality of teeth that extend in radial directions from an annular yoke and a plurality of slots defined between adjacent ones of the teeth, and a stator coil wound around the teeth, the stator coil comprising a plurality of U-shaped coil wires each having a first leg portion and a second leg portion that are parallel to each other, and a connecting portion that connects the first leg portion and the second leg portion, the method comprising:

an insertion step of inserting the first leg portion and the second leg portion of each of the coil wires into different ones of the slots, such that a distal end portion of the first leg portion and a distal end portion of the second leg portion protrude from corresponding ones of the slots, in parallel with an axial direction of the stator core, to provide a protruding portion of the first leg portion and a protruding portion of the second leg portion, respectively;

a bending step of bending the protruding portion of the first leg portion in a first circumferential direction of the stator core, at a proximal end portion of the protruding portion as a bending start point, from a condition where the protruding portion protrudes from a corresponding one of the slots in parallel with the axial direction of the stator core; and a pressing step of pressing a distal end of the protruding portion bent in the first circumferential direction, toward the proximal end portion of the protruding portion in a second circumferential direction of the stator core, wherein the distal end of the protruding portion is pressed in the second circumferential direction in the pressing step, so as to reach a final pressed position that is spaced by a predetermined amount in the first circumferential direction from a position of the proximal end of the protruding portion as a reference position, and the protruding portion is plastically deformed in the bending step and the pressing step.

2. The method according to claim 1, wherein the pressing step comprises further bending the protruding portion bent in the first circumferential direction in the bending step, in the first circumferential direction, while pressing the distal end in the second circumferential direction.

3. The method according to claim 2, wherein the bending step comprises bending the protruding portion in the first circumferential direction, by placing a jig at one side of the stator core such that the jig faces the protruding portion, and moving the jig toward the stator core in the axial direction while moving the jig in the first circumferential direction, in a condition where the jig is in contact with a distal end portion of the protruding portion, but is not in contact with a first circumferential end of the distal end portion of the protruding portion, the first circumferential end facing in the first circumferential direction, and the pressing step comprises bending the protruding portion in the first circumferential direction, while pressing the distal end of the protruding portion in the second circumferential direction, by use of the jig, by moving the jig toward the stator core in the axial direction while moving the jig in the first circumferential direction, in a condition where the jig is in contact with an axial end and the first circumferential end of the distal end portion of the protruding portion.

4. A production apparatus used in the method of producing a rotating electric machine stator according to claim 1, comprising:

a holder that holds the stator core, in a condition where the first leg portion and the second leg portion are inserted in different ones of the slots, such that the protruding portions of the first leg portion and the second leg portion protrude from the slots in parallel with the axial direction of the stator core;

a jig that bends the protruding portion of the first leg portion in the first circumferential direction, at the proximal end portion of the protruding portion as the bending start point, from a condition where the protruding portion protrudes in parallel with the axial direction of the stator core;

a jig driver that moves the jig; and a controller that controls the jig driver, wherein the controller controls the jig driver to move the jig relative to the stator core along a first locus, such that the jig become closer to the stator core, and then move the jig relative to the stator core along a second locus, the controller controls the jig driver to bend the protruding portion of the first leg portion in the first circumferential direction, at the proximal end portion of the protruding portion as the bending start point, through relative movement of the jig and the stator core along the first locus, and the controller controls the jig driver to press the protruding portion bent in the first circumferential direction until the distal end reaches the final pressed position, toward the proximal end in the second circumferential direction, through relative movement of the jig and the stator core along the second locus.

5. The production apparatus according to claim 4, wherein the controller controls the jig driver to further bend the protruding portion bent in the first circumferential direction along the first locus, in the first circumferential direction, while pressing the distal end in the second circumferential direction, through relative movement of the jig and the stator core along the second locus.

6. The production apparatus according to claim 5, wherein:

the jig includes a ring portion that is rotatable about an axis located on an extension of a center axis of the stator core, the ring portion including a plurality of claw portions that protrudes from an end face that faces the stator core;

each of the claw portions has a first face as a convex curved surface that faces in the first circumferential direction and protrudes toward the stator core, and a second face that faces in the second circumferential direction, the second face being a flat surface perpendicular to a circumferential direction or a concave curved surface that is recessed in the first circumferential direction; and the controller controls the jig driver to move the ring portion in the first circumferential direction while moving the ring portion toward the stator core in the axial direction, in a condition where the first face of each of the claw portions of the ring portion is in contact with a side face of the protruding portion of the first leg portion, and then move the ring portion in the first circumferential direction while moving the ring portion toward the stator core in the axial direction, in a condition where the second face of each of the claw portions is in contact with a first circumferential end of the protruding portion, such that the distal end of the protruding portion becomes closer to the proximal end, the first circumferential end facing in the first circumferential direction.

7. A method of producing a rotating electric machine stator including a stator core having a plurality of teeth that extend in radial directions from an annular yoke and a plurality of slots defined between adjacent ones of the teeth, and a stator coil wound around the teeth, the stator coil comprising a plurality of U-shaped coil wires each having a first leg portion and a second leg portion that are parallel to each other, and a connecting portion that connects the first leg portion and the second leg portion, the method comprising:

an insertion step of inserting the first leg portion and the second leg portion of each of the coil wires into different ones of the slots, such that a distal end portion of the first leg portion and a distal end portion of the second leg portion protrude from corresponding ones of the slots, in parallel with an axial direction of the stator core, to provide a protruding portion of the first leg portion and a protruding portion of the second leg portion, respectively;

a non-restrained bending step of bending the protruding portion of the first leg portion in a first circumferential direction of the stator core, at a proximal end portion of the protruding portion as a bending start point, in a non-restrained condition in which a distal end portion of the protruding portion is allowed to free move in the first circumferential direction of the stator core, from a condition where the protruding portion protrudes from a corresponding one of the slots in parallel with the axial direction of the stator core; and a restrained bending step of bending the protruding portion in the first circumferential direction while moving the distal end portion of the protruding portion to a predetermined position in the axial direction in a condition where the distal end portion is restrained at one side facing in the first circumferential direction, such that the distal end reaches a position that is returned in a second circumferential direction of the stator core from a position that would be reached in a case where the protruding portion bent in the first circumferential direction is assumed to be continuously bent in the first circumferential direction such that the distal end is moved to the predetermined position in the axial direction in the non-restrained condition.

* * * * *